(12) United States Patent  (10) Patent No.: US 7,669,244 B2
Smith  (45) Date of Patent: Feb. 23, 2010

(54) METHOD AND SYSTEM FOR GENERATING USER GROUP PERMISSION LISTS

(75) Inventor: Michael R. Smith, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 808 days.

(21) Appl. No.: 10/970,532

(22) Filed: Oct. 21, 2004

(65) Prior Publication Data

US 2006/0090208 A1  Apr. 27, 2006

(51) Int. Cl.
G06F 7/04 (2006.01)
G06F 17/30 (2006.01)
G06F 7/00 (2006.01)

(52) U.S. Cl. .......................... 726/26; 726/28; 707/9

(58) Field of Classification Search .................. 726/28, 726/26; 707/9
See application file for complete search history.

(56) References Cited

U.S. PATENT DOCUMENTS

| | | | | |
|---|---|---|---|---|
| 4,922,486 A | | 5/1990 | Lidinsky et al. | 370/60 |
| 5,017,917 A | * | 5/1991 | Fisher et al. | 340/14.1 |
| 5,113,442 A | * | 5/1992 | Moir | 713/167 |
| 5,251,205 A | | 10/1993 | Callon et al. | 370/60 |
| 5,615,264 A | | 3/1997 | Kazmierczak et al. | 380/4 |
| 5,764,762 A | | 6/1998 | Kazmierczak | 705/52 |
| 5,787,427 A | | 7/1998 | Benantar et al. | 707/9 |
| 5,911,143 A | * | 6/1999 | Deinhart et al. | 707/103 R |
| 5,941,947 A | * | 8/1999 | Brown et al. | 709/225 |
| 5,968,177 A | * | 10/1999 | Batten-Carew et al. | 726/4 |
| 6,014,666 A | * | 1/2000 | Helland et al. | 707/9 |
| 6,023,765 A | | 2/2000 | Kuhn | 713/200 |
| 6,088,659 A | * | 7/2000 | Kelley et al. | 702/62 |
| 6,092,191 A | | 7/2000 | Shimbo et al. | 713/153 |
| 6,202,066 B1 | * | 3/2001 | Barkley et al. | 707/9 |
| 6,233,618 B1 | | 5/2001 | Shannon | 709/229 |
| 6,289,462 B1 | | 9/2001 | McNabb et al. | 713/201 |
| 6,292,798 B1 | * | 9/2001 | Dockter et al. | 707/9 |
| 6,304,973 B1 | | 10/2001 | Williams | 713/201 |

(Continued)

FOREIGN PATENT DOCUMENTS

EP  0 465 016 A2  6/1991

(Continued)

OTHER PUBLICATIONS

Pfleeger et al., Security in Computing, 2003, Prentice Hall, 3rd Ed., pp. 194-207.*

(Continued)

*Primary Examiner*—Kambiz Zand
*Assistant Examiner*—William S Powers
(74) *Attorney, Agent, or Firm*—Campbell Stephenson LLP

(57) ABSTRACT

A method and apparatus for generating user group identifiers using a permissions matrix is disclosed. The permissions matrix includes an entry that is associated with a row and a column of the permissions matrix. The row of the permissions matrix is indexed with a first role and the column of the permissions matrix is indexed with a second role. A data structure implementing such a method can include, for example, a user group identifier matrix. Alternatively, a method is disclosed in which the expiration of a user group identifier is detected. In such a case, the user group identifier is updated by accessing a user group identifier matrix.

71 Claims, 14 Drawing Sheets

U.S. PATENT DOCUMENTS

| | | | |
|---|---|---|---|
| 6,405,259 | B1 | 6/2002 | Cheston et al. ............. 709/245 |
| 6,449,643 | B1* | 9/2002 | Hyndman et al. ........... 709/223 |
| 6,711,172 | B1 | 3/2004 | Li ............................... 370/401 |
| 6,754,214 | B1 | 6/2004 | Mahalingaiah .............. 370/392 |
| 6,973,057 | B1 | 12/2005 | Forslow ....................... 370/328 |
| 6,985,948 | B2* | 1/2006 | Taguchi et al. .............. 709/225 |
| 7,000,120 | B1 | 2/2006 | Koodli et al. ............... 713/201 |
| 7,032,243 | B2 | 4/2006 | Leerssen et al. ............... 726/17 |
| 7,136,374 | B1 | 11/2006 | Kompella ................... 370/352 |
| 7,207,062 | B2 | 4/2007 | Brustoloni ................... 726/13 |
| 7,284,269 | B2 | 10/2007 | Marquet et al. ............... 726/13 |
| 7,417,950 | B2 | 8/2008 | Hofmeister et al. ......... 370/230 |
| 2002/0026592 | A1 | 2/2002 | Gavrila et al. ............... 713/201 |
| 2002/0035635 | A1 | 3/2002 | Holden ....................... 709/230 |
| 2002/0184521 | A1 | 12/2002 | Lucovsky et al. ........... 713/200 |
| 2003/0088786 | A1 | 5/2003 | Moran et al. ................ 713/201 |
| 2003/0110268 | A1 | 6/2003 | Kermarec et al. ........... 709/227 |
| 2003/0145232 | A1 | 7/2003 | Poletto et al. ............... 713/201 |
| 2003/0154400 | A1 | 8/2003 | Pirttimaa et al. ............ 713/201 |
| 2004/0017816 | A1 | 1/2004 | Ishwar et al. ........... 370/395.53 |
| 2004/0044908 | A1 | 3/2004 | Markham et al. ........... 713/201 |
| 2004/0156313 | A1 | 8/2004 | Hofmeister et al. ......... 370/229 |
| 2004/0202171 | A1 | 10/2004 | Hama ...................... 370/395.1 |
| 2004/0264697 | A1 | 12/2004 | Gavrilescu et al. .......... 380/255 |
| 2005/0055573 | A1 | 3/2005 | Smith .......................... 713/201 |
| 2005/0097357 | A1 | 5/2005 | Smith .......................... 713/201 |
| 2005/0177717 | A1 | 8/2005 | Grosse ........................ 713/160 |
| 2005/0190758 | A1 | 9/2005 | Gai et al. ..................... 370/389 |
| 2005/0198412 | A1 | 9/2005 | Pedersen et al. .............. 710/30 |
| 2006/0010483 | A1* | 1/2006 | Buehler et al. ................. 726/1 |
| 2006/0090208 | A1 | 4/2006 | Smith ........................... 726/26 |
| 2006/0106750 | A1 | 5/2006 | Smith ............................. 707/1 |
| 2006/0112425 | A1 | 5/2006 | Smith et al. ................... 726/13 |
| 2006/0112426 | A1 | 5/2006 | Smith et al. ................... 726/13 |

FOREIGN PATENT DOCUMENTS

| | | |
|---|---|---|
| EP | 0 697 662 A1 | 2/1996 |
| EP | 0 849 680 A2 | 12/1997 |
| EP | 1 067 745 A2 | 11/1999 |
| JP | 2002 164937 | 6/2002 |
| WO | WO 2005/027464 | 3/2005 |

OTHER PUBLICATIONS

Islam, An Access Control Method with Subject-Object Key and Time Stamp, Jun. 2003, Malaysian Journal of Computer Science, vol. 16, No. 1, pp. 77-83.*

Barkley et al., Supporting Relationships in Access Control Using Role Based Access Control, Jul. 1999.*

IEEE Standard for Information Technology-Telecommunications and Information Exchange Between Systems-Local and Metropolitan Area Networks-Common Specifications, *Part 3: Media Access Control (MAC) Bridges*, ANSI/IEEE Std. 802.1D, 1998 Edition, Dec. 10, 1998, pp. 1-355.

Computer Systems Laboratory, National Institute of Standards and Technology, *Standard Security Label for Information Transfer*, Federal Information Processing Standards Publication 188 (FIPS PUB 188), Category: Computer Security, Subcategory: Security Labels, Sep. 6, 1994, pp. 1-25.

Wang, Ning and Pavlou, George, Scalable sender access control for bi-directional multicast routing, Computer Networks, Elsevier Science Publishers B.V., vol. 43, No. 5, Dec. 5, 2003, pp. 539-555.

Valenzi, Kathleen D., Digital Signatures: An Important "Sign" of the Future of E-Government, virginia.edu, vol. IV, No. 2, Fall 2000, Copyright 2000 The Rector and Board of Visitors of the University of Virginia, 6 pages.

Microsoft® Computer Dictionary, Fifth Edition, Publisher: Microsoft Press, Pub. Date: May 1, 2002, Excerpt of terms: digital signature -digital signature standard & routable protocol—routing table, p. 656.

Stevens, Richard W., TCP/IP Illustrated vol. 1, The Protocols, Copyright © 1994 Addison Wesley Longman, Inc., pp. 112-117.

CDAT Overview, http: www.cisco.com/universalcd/cc/td/doc/, Solution/sesm/sesm_313toolguid/chi1_overview.htm. Copyright 1992-2002 Cisco Systems, Inc.

* cited by examiner

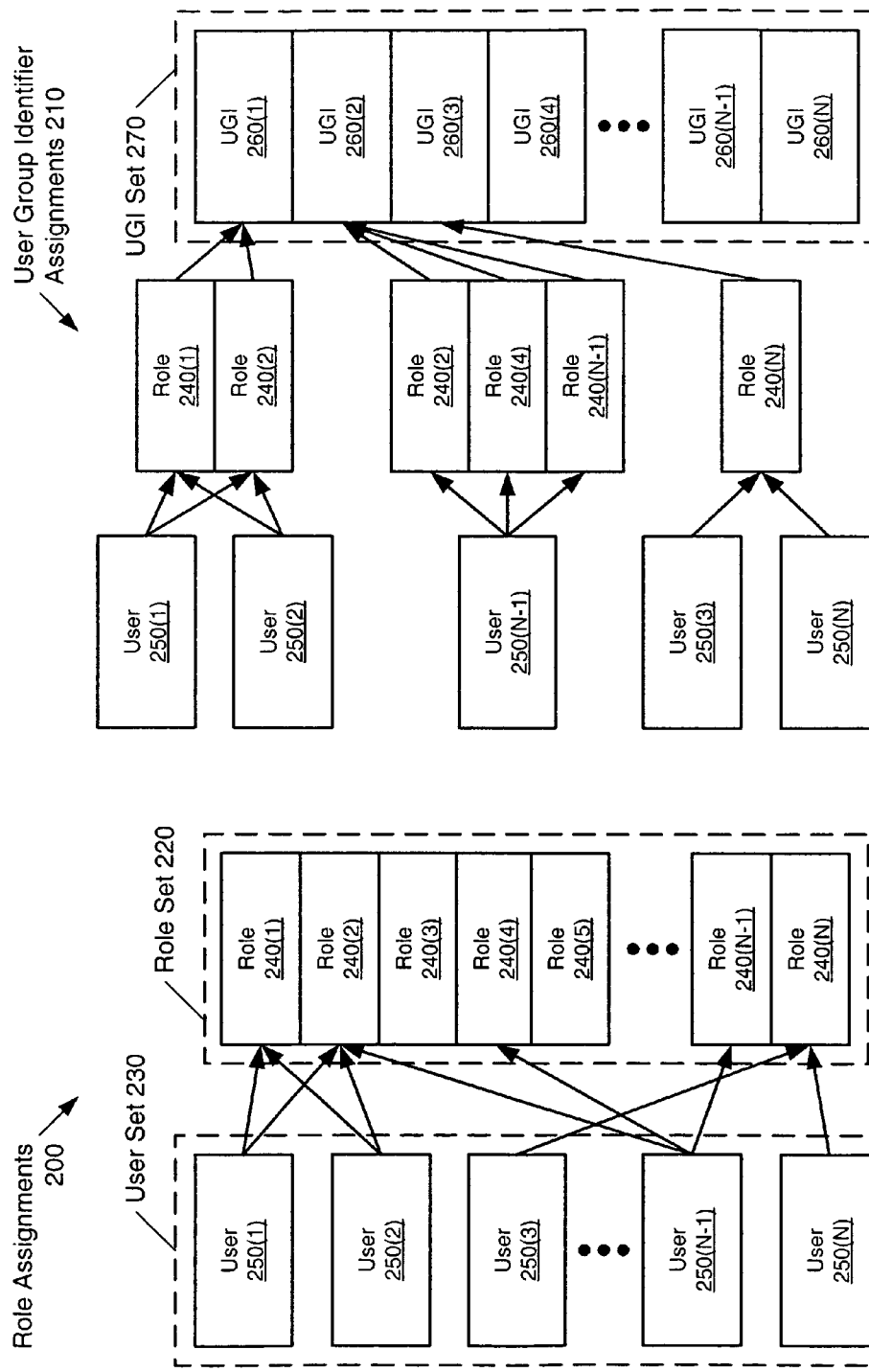

METHOD AND SYSTEM FOR GENERATING USER GROUP PERMISSION LISTS

BACKGROUND OF THE INVENTION

1. Field of the Invention

This invention relates to the field of information network security, and more particularly relates to a method and data structure for user group identifier formation.

2. Description of the Related Art

Flexible network access technologies such as wireless, Dynamic Host Configuration Protocol (DHCP), virtual private network (VPN) gateways and the like allow users access to a given protected network from a variety of access or entry points. This is true of all manner of networks, including enterprise networks, service provider networks and the like. At the same time, the security afforded while providing such access is of increasing concern. Technologies based on Remote Authentication Dial-In User Service (RADIUS), Terminal Access Controller Access Control System (TACACS), the DIAMETER protocol and other protocols allow a user to be authenticated upon entry to the network.

As is known, communications paths across such networks are conceptually separate (e.g., can be viewed as separate virtual paths), although they may traverse some or all of the same network devices (i.e., physical segments), and so are controlled separately using, for example, access control lists (ACLs). Conventionally, constraints upon access enjoyed by network users are enforced by ACLs, which are used to process packets and so control the network traffic of such users. For scalability and manageability, conventional ACLs require the mapping of a user host address (as the source of the given packet(s); for example, an internet protocol (IP) address) to be relatively static, or the security policy to be sufficiently lax to allow all addresses possible for the user.

Providing effective network security with traditional ACLs is problematic for a number of reasons. First, it is becoming increasingly difficult to generate and maintain the number of ACLs needed to protect a growing network. ACLs are conventionally applied to a given interface and contain IP addresses which tie the security policy directly to the network topology. As a result, a change in the network such as repartitioning of sub-nets causes the security policy to be revisited. Moreover, it would appear that ACLs in various parts of the network would need to be updated each time a user authenticated to the network, in order to add rules associated with the source IP address assigned to this user's host, which would be specific to that user. This would cause a huge increase in the number of unique ACLs and dramatically increase the rate at which such rules would have to be updated.

Furthermore, there also exists the problem of the generating an ACL large enough to define access control for an increasing number of individual IP addresses in a network. The number of entries in an ACL is often the number of source addresses multiplied by the number of destination addresses, multiplied by the number of permissions. As a result, the addition of a single individual IP address can have a significant impact on the size of a substantial number of ACLs. Therefore, the addition of a single IP address can result in a dramatic increase in the cost of generating and maintaining the ACLs.

When a customer changes the network topology, the ACLs must be reexamined. Since such ACLs can quite easily reach several hundred or even several thousand of lines in length, such a reexamination can be non-trivial, to say the least. Due to the complexity of such an ACL, the confidence in the changes that are made is not very high, typically, and the ACLs often require extensive testing by the user before being placed in a production environment. Moreover, because platforms using content-addressable memories (CAMs) to implement ACLs require recompiling of some or all of the ACLs when any change is made, the increases in processing cost can be quite severe, approaching a quadratic in the number of users. These increases in complexity increase the chance of a network outage, a security hole, or both. Therefore, placing such ACLs throughout the enterprise network therefore impacts the manageability of today's networks. Given the foregoing, particularly in light of the increasingly flexible access that is required now and will be required in the future, relying on existing ACL management, generation and maintenance is difficult.

What is required, then, is a mechanism that allows for the efficient generation and maintenance of network access control information. Preferably, such an approach should employ existing ACL technology, while making the generation of ACLs more efficient. Also preferably, such an approach should simplify ACL maintenance without incurring a disproportionate administrative burden or consuming inordinately large amounts of network resources.

SUMMARY

In one embodiment, a method of generating a permissions matrix is disclosed. The permissions matrix includes an entry that is associated with a row and a column of the permissions matrix. The row of the permissions matrix is indexed using a first role and the column of the permissions matrix is indexed using a second role.

In a different embodiment, a method of forming a role permissions matrix is disclosed. A row of the role permissions matrix is indexed using a first role and a column of the role permissions matrix is indexed using a second role. A role permissions list describes an access control relationship between the first role and the second role, and the role permissions list is accessed through an entry in the role permissions matrix.

In another embodiment, a method is disclosed in which the expiration of a user group identifier is detected. The user group identifier is updated by accessing a user group identifier matrix.

In yet another embodiment, a data structure, in a computer readable medium, is disclosed. The data structure includes a user group identifier matrix. The user group identifier matrix includes an entry that is associated with a row and a column of the user group identifier matrix. The row of the user group identifier matrix is indexed using a first user group identifier and the column of the user group identifier matrix is indexed using a second user group identifier.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description.

BRIEF DESCRIPTION OF THE DRAWINGS

The present invention may be better understood, and numerous objects, features, and advantages made apparent to those skilled in the art by referencing the accompanying drawings.

FIG. 2A is a diagram illustrating relationships between users and roles according to embodiments of the present invention.

FIG. 2B is a diagram illustrating relationships between users, roles and user group identifiers according to embodiments of the present invention.

DETAILED DESCRIPTION OF THE INVENTION

Figure 1A:
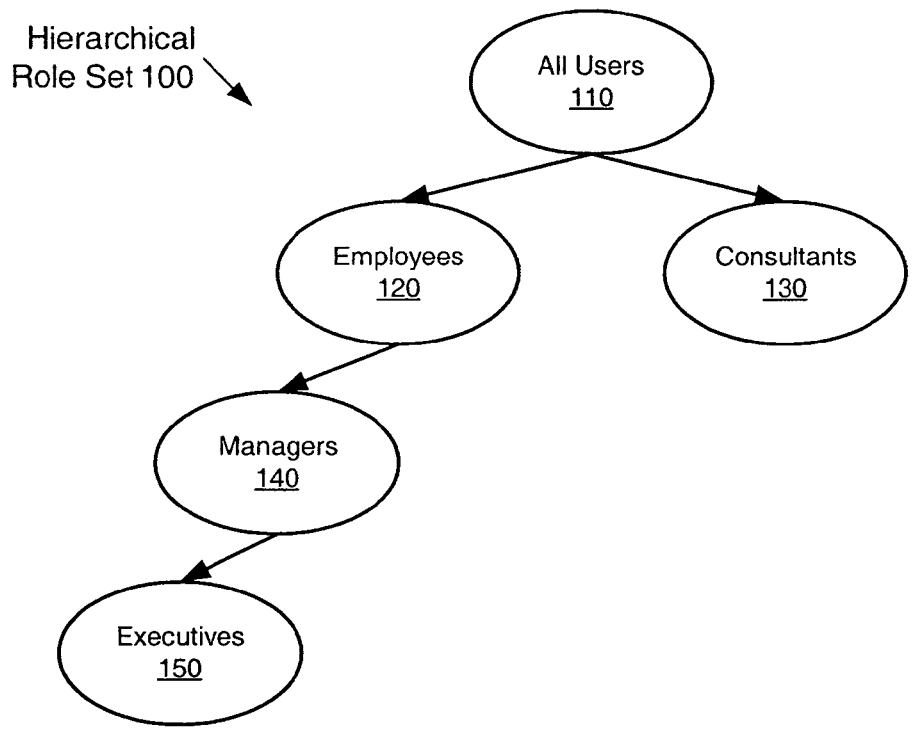
FIG. 1A is a diagram illustrating a hierarchical role set according to embodiments of the present invention.

The following is intended to provide a detailed description of an example of the invention and should not be taken to be limiting of the invention itself. Rather, any number of variations may fall within the scope of the invention, which is defined in the claims following the description.

Introduction

The present invention provides a method, system and data structure that addresses the limitations outlined previously by providing an efficient and effective approach to the generation of permissions matrices, which are designed to directly address such problems. Permissions matrices apply user-group-permissions-lists (UGPLs) between user groups and role permissions lists between roles. User groups can be groups of users with the same roles within an organization, for example. The network access permitted a user (e.g., a person having a user identifier, a server, internet protocol (IP) telephone, and other such network devices) is conventionally based on the role(s) assigned to the user by the enterprise, the privelage(s) the user has as an internet service provider (ISP) customer, or similar criteria. It will be appreciated that such a user can, in fact, be a person having a user identifier, a network device, a telecommunications device or some other identifiable device or entity with a need for access to a communications network. UGPLs are used to control network traffic by maintaining the information regarding the permissions to be applied to that network traffic, based on the user group of the user generating the network traffic.

According to a method of the present invention, a user group identifier (UGI) matrix is formed. The UGI matrix provides access to user group permissions. According to one embodiment, a security administrator forms a set of roles and defines role permissions lists. The role permissions lists set forth the security relationships between roles. A role permissions list can be, for example, a list that defines the access control relationships between two roles, such as a role based access control list (RBACL). A role permissions matrix is formed to facilitate access to the role permissions lists. For example, the role permissions matrix can be an N×N matrix, where N is the number of roles in the role set. An entry in the role permissions matrix, referred to herein as a role permissions matrix entry (RPME), provides access to a role permissions list associated the row and column of the RPME. In one embodiment, the row of the RPME corresponds to a source role and the column of the RPME corresponds to a destination role.

The security administrator also forms a set of users and assigns each user from the set of users to one or more roles. The roles assigned to a user form a role subset. Each role subset is assigned a user group with a corresponding UGI. Thus, each user is assigned the UGI that corresponds to the user's role subset. Once all of the users are assigned to a UGI, the entire set of UGIs is known and the UGPLs can be formed. The UGPLs set forth access control relationships between user groups.

In one embodiment, UGPLs are accessible through entries in a UGI matrix. A UGI matrix is similar in some respects to the role permissions matrix. The set of all UGIs can be used to index the rows and columns of the UGI matrix. In this case, the UGI matrix is an N×N matrix, where N is the number of UGIs in the set of all UGIs. In one embodiment, the columns of the UGI matrix are indexed by destination groups and the rows are indexed by source groups. Alternatively, the columns of the UGI matrix can be indexed by source groups and the rows can be indexed by destination groups.

In one embodiment, an entry in the UGI matrix is formed by taking the Cartesian product of the source and destination UGIs that correspond to the entry. Taking the Cartesian product of the role sets represented by two UGIs will yield a set of ordered pairs. Each of the ordered pairs provides an index into the role permissions matrix, and thus can provide an index to a role permissions list. The set of ordered pairs is used to obtain a set of role permissions lists, and the role permissions lists are merged to create a UGPL. The UGPL is then made accessible through the entry in the UGI matrix. The foregoing steps are performed for each entry in the UGI matrix.

UGPLs, UGIs and UGI permissions matrices can be used to make a determination as to the handling of a packet sourced by a network entity. A user group can be assigned, for example, when the network entity (e.g., a user) is authenticated (e.g., as part of user authentication via the 802.1X protocol, or other such mechanism). Thus, when the network entity authenticates, the network entity is placed into a user group. Authentication can be based on user identification, server function in the network, or other such characteristic. Then, when a packet is sourced onto the network, a UGI is inserted into the packet. As the packet traverses the network, the UGI is carried along with the other information in the packet. At the egress edge of the network, the destination group can be derived. For example, at the "L3" edge (using an open systems interconnection (OSI) model, the network device at the edge of the layer 3 network), the destination group can be derived from the network device's forwarding information base (FIB) via a fully-resolved host prefix. The host prefix is resolved through the address resolution protocol (ARP). The ARP response is tagged with the destination group when the packet is sourced onto the network. The FIB result is populated with the destination group in addition to the rewrite information. Once the source and destination groups have been determined, the UGPL can be accessed through the UGI matrix using this information.

Key advantages of the present invention include the multiplicative reduction of the size of the permissions list, multiplicative increase in software permissions list performance, decoupling of the network's topology and the security (or other features) policies (allowing permissions lists to follow the user as the user moves through the enterprise), and simplified network management.

The Implementation of Permission Matrices in UG Identifier Formation

FIG. 1A is a diagram illustrating a hierarchical role set 100 according to embodiments of the present invention. Hierarchical role sets are similar to class hierarchies found in object oriented programming. Each child role inherits permissions from its parent role and extends those permissions with its own. In FIG. 1A, hierarchical role set 100 is depicted as including a number of roles, each of which has dependencies on other roles. Hierarchical role set 100 includes an all users role 110, an employees role 120, a consultants role 130, a managers role 140 and an executives role 150. As can be seen in FIG. 1A, these roles are hierarchically related to one another, with executives role 150 being a subset of managers role 140, managers role 140 being subset of employees role 120, and employees role 120 and consultants role 130 being subsets of all users role 110. In this manner, access to various resources can be limited based on the role(s) to which a user belongs. For example, a user may belong to the managers role. Typically, a user in managers role 140 will have access to more of the computing and informational resources of the organization than will a user in employees role 120, and less of such access than a user in executives role 150. As will be apparent, the farther one traverses down in the role hierarchy, the greater the level of responsibility, and so, the greater the amount of access.

Figure 1B:
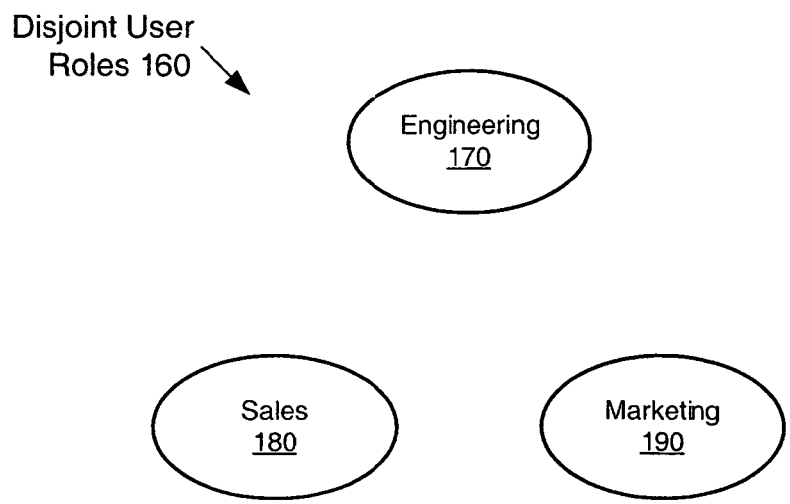
FIG. 1B is a diagram illustrating a disjoint set of roles according to embodiments of the present invention.

FIG. 1B is a diagram illustrating a disjoint set of user roles 160 according to embodiments of the present invention. Disjoint user roles are used where there are non-overlapping, equal, and non-related functions. In the actual implementation of role permissions lists, hierarchical user roles can be implemented using disjoint user roles and the hierarchy management (if present) can be made the responsibility of the network management entity responsible for configuring the role permissions lists. These roles include an engineering role 170, a sales role 180 and a marketing role 190. Such disjoint user roles are used where there are non-overlapping, equal and non-related functions performed by the roles in question. Because the responsibilities of each of these roles is so different and distinct from that of the other roles, each of these roles would be expected to have their own set of resources, accessible by members of the given role. Thus, it would be expected that the users in a given role would maintain the same set of permissions, allowing them access to the same set of resources, although this need not strictly be the case.

It will be appreciated that groups of users are put into the same role because they share the same permissions. This creation of roles does not imply that no communications occur between or across user roles. Nor does this imply that there is no permission enforcement within a given role. It simply implies that within a role, the users will have the same privileges within the network.

It should be noted that the implementation of role-based access control (RBAC) presents special problems in a network environment. Due to the bidirectional nature of network communications, access control needs to be applied both between the user (host) and the object (server), and between the object (server) and the user (host). This requires the users to be grouped together into a role and, similarly, the objects to also be grouped together in a role. At this point, the access control is applied strictly between the groups. With such a decoupling, the network devices are free to move throughout the network, and change IP addresses. Entire network topologies can change without disrupting the security policies implemented by the existing role permissions lists. As long as the roles and the permissions remain the same, such changes can occur without affecting the security policy in place. From the view of any given packet, the packet is simply being sourced from one group, destined for another group, where the two groups may or may not be different.

It will be noted that the variable identifier "N" is used in several instances in the figures described herein to more simply designate the final element of a series of related or similar elements. The repeated use of such variable identifiers is not meant to necessarily imply a correlation between the sizes of such series of elements, although such correlation may exist. The use of such variable identifiers does not require that each series of elements have the same number of elements as another series delimited by the same variable identifier. Rather, in each instance of use, the variable identified by "N" (or any other such identifier) may hold the same or a different value than other instances of the same variable identifier.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals may be characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

FIG. 2A is a diagram illustrating relationships between users and roles according to embodiments of the present invention. A security administrator, or other entity appropriate to the task, defines a role set 220 that includes roles 240 that are available to be assigned to users 250. The security administrator also defines a user set 230 and assigns users 250 to their respective roles 240. As previously discussed, one user can have many roles. Furthermore, a user may be assigned to just to one role, or may not be assigned to any roles. Conversely, two or more users can be assigned to the same role or set of roles.

FIG. 2B is a diagram illustrating relationships between users, roles and user group identifiers (UGIs) according to embodiments of the present invention. As previously mentioned, the roles assigned to a user form a role subset. The role subset assigned to each user can be role set 220 or a subset of role set 220, and a single role may appear in multiple role subsets or may not appear in any role subsets. A security management station, or other entity appropriate to the task, examines the role subsets and assigns a UGI 260 from a UGI set 270 to each role subset. In one embodiment, a security management station improves network efficiency by eliminating redundant role sets. After the redundant role sets are eliminated, each role set contains a subset of roles that is different from any other subset of roles. As a result, multiple users may be assigned to have the same role subset, and therefore, the same UGI.

The example depicted in FIGS. 2A and 2B shows the following roles assignments:

User 250(1), User 250(2)=Role 240(1), Role 240(2)
User 250(3), User 250(N)=Role 240(N)
User 250(N-1) =Role 240(2), Role 240(4), Role 240(N-1)

Thus, Role 240(1) and Role 240(2) form a role subset, Role 240(N) forms a role subset, and Role 240(2), Role 240(4), and Role 240(N-1) form a role subset. User 250(1) and User 250(2) have the same role subset, and User 250(3) and User 250(N) have the same role subset. Role 240(3) and Role 240(5) are not included in any of the role subsets shown in FIG. 2B.

The example depicted in FIG. 2B shows the following UGI assignments:

UGI 260(1) =Role 240(1), Role 240(2)
UGI 260(2) =Role 240(2), Role 240(4), Role 240(N-1)
UGI 260(3) =Role 240(N)

It will be noted that UGI 260(1) corresponds to a user group that includes User 250(1) and User 250(2). It will also be noted that UGI 260(1) corresponds to Role 240(1) and Role 240(2). In other words, a UGI can represent one or more users with the same role subset. The example illustrated in FIGS. 2A and 2B will be revisited as the formation of UGIs is further explained.

In one embodiment, a fixed number of UGIs are available, and for each role set, a UGI is allocated from a free pool of UGIs. Alternatively, a dynamic number of UGIs can be made available for assignment. In either embodiment, UGI values will initially be in the free pool of UGIs. When a UGI value is assigned to a role set, that UGI value is removed from the free pool. Because only one UGI is used for each role set, if a user's role set contains the same roles as another user, both users will be assigned the same UGI value.

Figure 3:
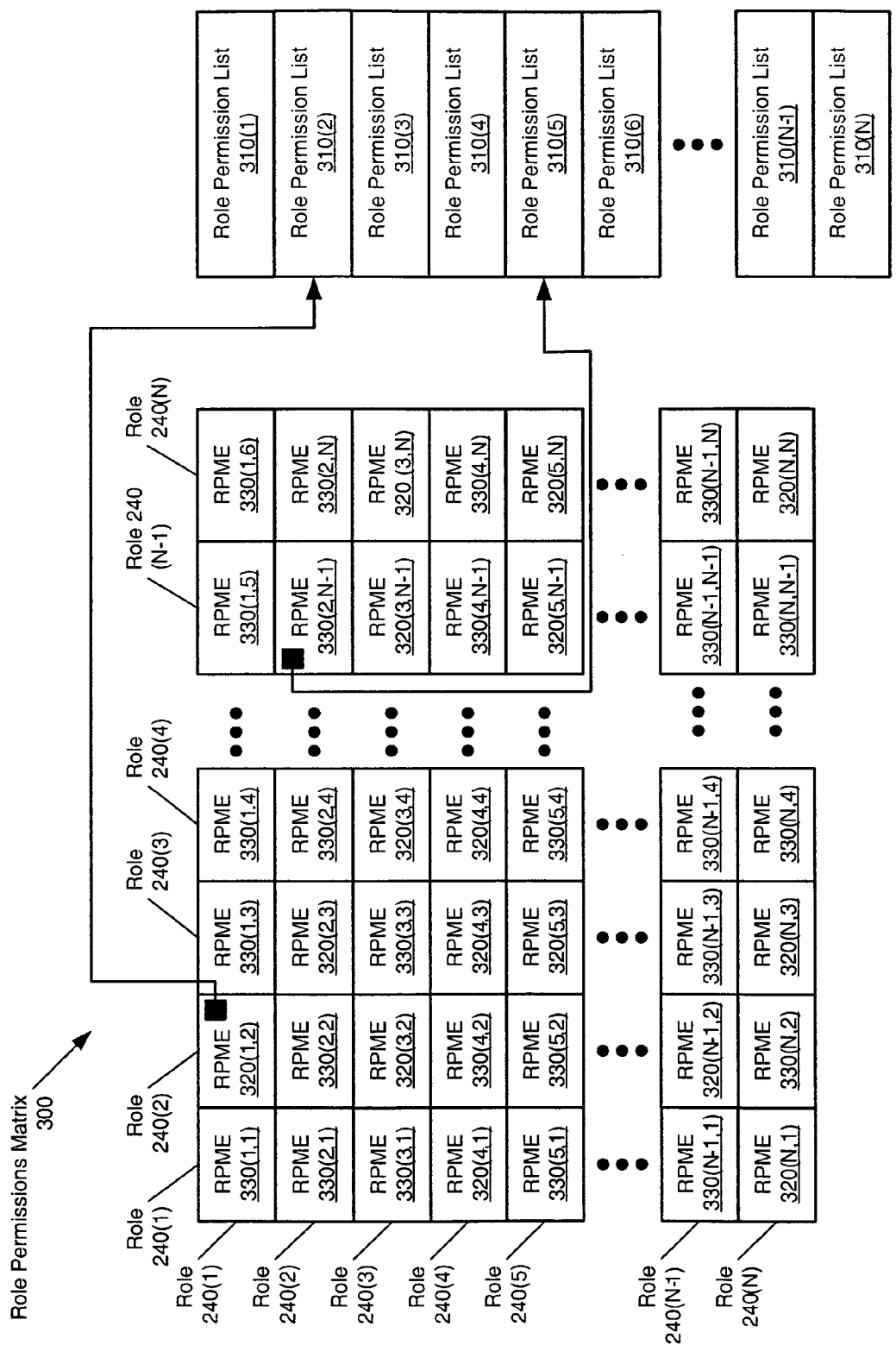
FIG. 3 is a block diagram illustrating a role permissions matrix according to embodiments of the present invention.

FIG. 3 is a block diagram illustrating a role permissions matrix according to embodiments of the present invention. After the security administrator assigns users to their respective roles and defines inter-role and intra-role relationships, the security management station forms a role permissions matrix 300. The columns and rows of role permissions matrix 300 can be indexed by a set of roles. The set of roles used to index the columns of the role permissions matrix can be the same set of roles used to index the rows of the role permissions matrix. In an alternative embodiment, the set of roles used to index the columns of the role permissions matrix is different than the set of roles used to index the rows of the role permissions matrix.

In the embodiment shown in FIG. 3, role permissions matrix 300 is an N×N matrix, where N is the total number of roles available for assignment to users. Role permissions matrix entries (RPMEs) of role permissions matrix 300 include populated RPMEs 320 and unpopulated RPMEs 330. Ordinarily, each unpopulated RPME 330 is interpreted as an implicit denial. However, if necessary, each unpopulated RPME 330 can be treated as an implicit acceptance. Populated RPMEs 320 provide access to role permissions lists 310. Populated RPMEs 320 can provide access to role permissions lists 310 by using pointers that reference role permissions lists 310, as shown in FIG. 3, or populated RPMEs 320 can contain role permissions lists 310. In another embodiment, populated RPMEs 320 can be used to store identification information associated with role permissions lists 310. Role permissions lists 310 are defined to be applied between the role corresponding to the column of role permissions matrix 300 and the role corresponding to the row of role permissions matrix 300. In one embodiment, the columns of role permissions matrix 300 are indexed with destination roles and the rows of role permissions matrix 300 are indexed with source roles.

For an example of providing network security by using role-based access control, see patent application Ser. No. 10/659,614, filed Sep. 10, 2003, entitled "METHOD AND APPARATUS FOR PROVIDING NETWORK SECURITY USING ROLE-BASED ACCESS CONTROL," having Michael R. Smith as inventor, which is hereby incorporated by reference, in its entirety and for all purposes.

Figure 4:
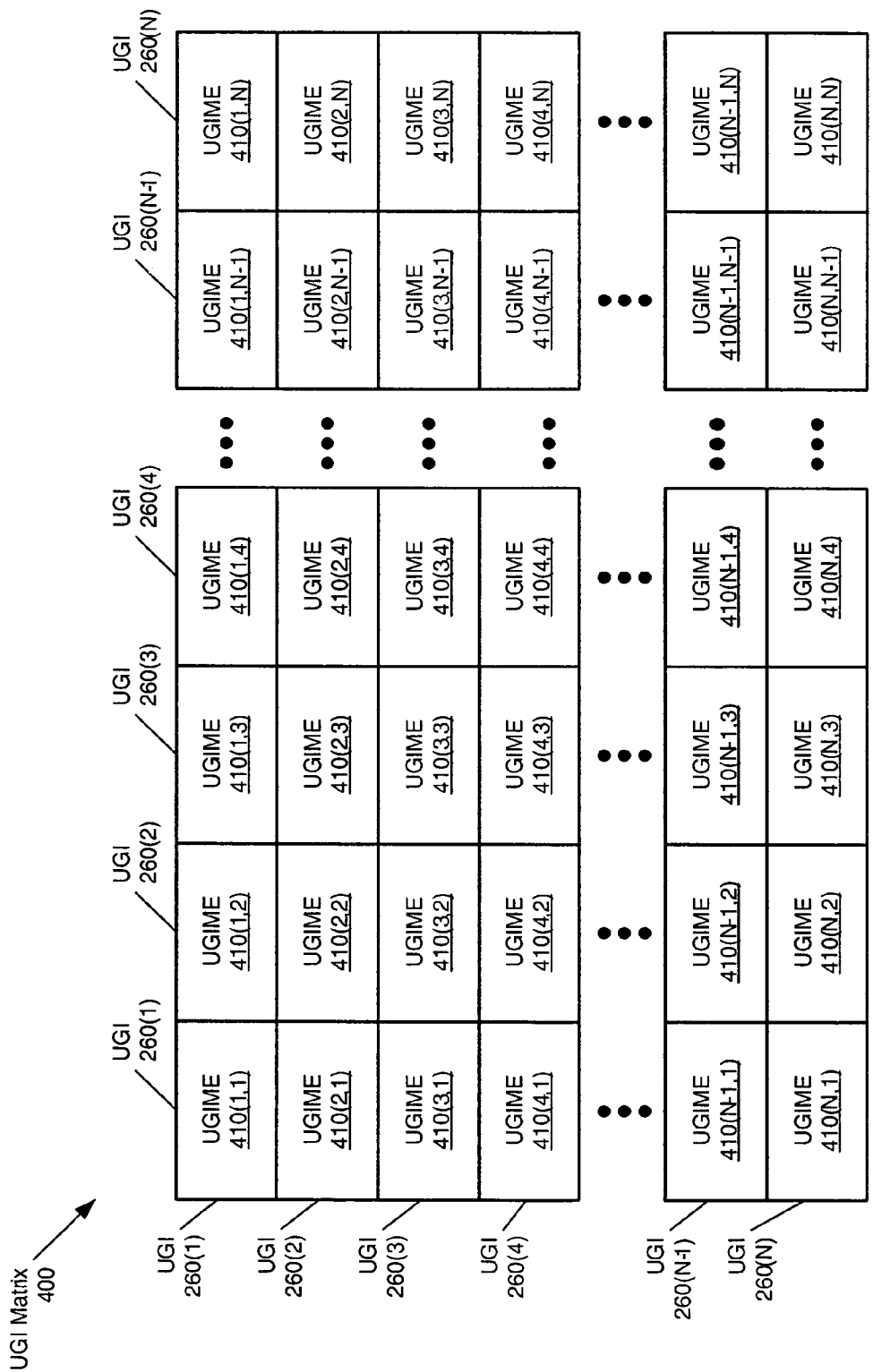
FIG. 4 is a block diagram illustrating a user group identifier matrix according to embodiments of the present invention.

FIG. 4 is a block diagram illustrating a UGI matrix 400 according to embodiments of the present invention. The rows and columns of UGI matrix 400 are indexed by UGI set 270. UGI set 270 includes UGIs 260 that are assigned to user's role subsets. Because both the rows and the columns of UGI matrix 400 are indexed by the same UGI set, UGI matrix 400 is an N×N matrix. In an alternative embodiment, the rows of UGI matrix 400 are indexed by a different set of UGIs than the columns of UGI matrix 400. Entries of UGI matrix 400, referred to herein as user group identifier matrix entries (UGIMEs) 410, provide access to UGPLs.

UGIMEs 410 also play a role in the formation of the UGPLs. A UGPL is formed by taking the Cartesian product of the corresponding UGIME's row and column UGIs. For example, the UGPL accessible through UGIME 410(1,2) is formed by taking the Cartesian product of the role sets associated with UGI 260(1) and UGI 260(2). Each entry in UGI matrix 400 is populated in this manner.

Figure 5:
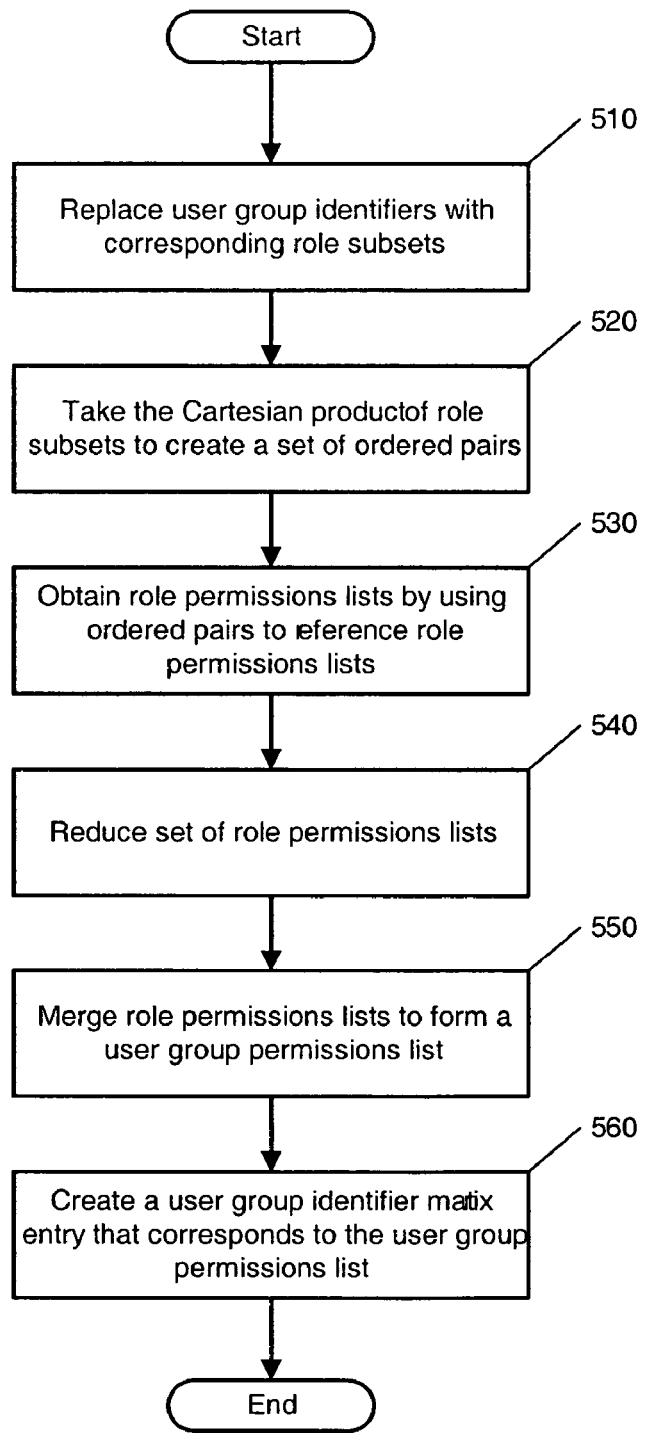
FIG. 5 is a flow diagram illustrating an example of taking the Cartesian product of two user group identifiers according to embodiments of the present invention.

FIG. 5 is a flow diagram illustrating an example of taking the Cartesian product of two UGIs according to embodiments of the present invention. A UGIME is associated with two UGIs, one for the column (column UGI) and one for the row (row UGI). The row UGI and the column UGI are both replaced with their corresponding role subsets (step 510). Then, the Cartesian product of the two role subsets is taken to create a set of ordered pairs (step 520). Each ordered pair corresponds to an entry in the role permissions matrix. A role permissions list is then obtained for each ordered pair by using the ordered pairs to reference the role permissions lists through the role permissions matrix (step 530). The role permissions lists acquired in step 530 form a set of role permissions lists that correspond to the role subsets of the row UGI and the column UGI.

The set of role permissions lists can then be reduced to simplify the formation of the UGPL (step 540). Set theory axioms can be used to perform this reduction. For example, since the role permissions matrix is often sparsely populated, many elements will be empty. Set theory teaches that the union of a set A with an empty set B is just the set A: A ∪ B =A. Since the unspecified role matrix entries can be considered empty sets, the unspecified entries can be removed from the equation. Sets can also be reordered according to the following axioms: (A ∪ B) ∪ A=A ∪ (B ∪ A), A∪B=B ∪ A, and A ∪ A=A so that all duplicate role permissions lists can be removed to reduce the set of role permissions lists. By using the various set theory axioms, the set of role permissions lists can be quickly reduced.

In another embodiment, the ordered pairs are used to obtain a set of role matrix entries from the role permissions matrix. The role matrix entries can be reduced before the role permissions lists are downloaded. Only the role permissions lists corresponding to the remaining role matrix entries are downloaded, thus reducing the number of role permissions lists that are actually downloaded. Therefore, the set of role permissions lists can be reduced before or after the role permissions lists are downloaded.

The remaining role permissions lists are merged to form a UGPL (step 550). In one embodiment, this merger can be performed using the set union operation. This equates to a least restrictive merge of the role permissions lists, meaning that an action is permitted if at least one role permission list policy states that the action is allowed. After the UGPL is formed, a UGIME that corresponds to the UGPL is created (step 560).

FIGS. 2A, 2B, 3 and 4 are now revisited to provide an example of an implementation of the steps illustrated in FIG. 5. To populate, for example, UGIME 410(1,2) of FIG. 4, the Cartesian product of UGI 260(1) and UGI 260(2) is taken:

UGI 260(1)×UGI 260(2)

As shown in FIG. 2B, UGI 260(1) is assigned to the role subset containing Role 240(1) and Role 240(2). Thus, UGI 260(1) is replaced by its corresponding role subset: Role 240(1), shown below as R1, and Role 240(2), shown below as R2. UGI 260(2) is assigned to the role subset containing Role 240(2), Role 240(4) and Role 240(N-1). UGI 260(2) is replaced by its corresponding roles: Role 240(2), shown below as R2, Role 240(4), shown below as R4, and Role 240(N-1) shown below as R[N-1]. After the replacements are performed, the Cartesian product of two UGIs becomes the Cartesian product of two role subsets:

(R1, R2)×(R2, R4, R[N-1])

In set notation, the Cartesian product of two sets, A and B, is defined as:

A×B={(a,b)|a ∈ A ^ b ∈ B}

In other words, the Cartesian product of A and B is the set of all ordered pairs (a,b) where a is any element of A and b is any element of B. Therefore:

$$(R1, R2) \times (R2, R4, R[N-1]) = \begin{matrix} (R1, R2), (R1, R4), (R1, R[N-1]) \\ (R2, R2), (R2, R4), (R2, R[N-1]) \end{matrix}$$

Taking the Cartesian product of the role subsets (R1, R2) and (R2, R4, R[N-1]) yields a set of ordered pairs: (R1, R2), (R1, R4), (R1, R[N-1]), (R2, R2), (R2, R4), (R2, R[N-1]). Each ordered pair references a role permissions matrix entry (RPME), and each RPME is either an unpopulated RPME or a populated RPME. The first ordered pair, (R1, R2) can be used to reference RPME 320(1, 2) of FIG. 3. As shown, RPME 320(1, 2) points to Role Permissions List 310(2). Ordered pairs (R1, R4), (R1, R[N-1]), (R2, R2), (R2, R4) reference RPME 330(1, 4), RPME 330(1, N-1), RPME 330 (2, 2), and RPME 330(2, 4), respectively. These are unpopulated entries, and as such, do not point to role permissions lists. The last ordered pair, (R2, R[N-1]) can be used to reference RPME 320(2, N-1) of FIG. 3. As shown, RPME 320(2, N-1) points to Role Permissions List 310(5). Thus, the set of RPMEs contains four unpopulated RPMEs and two populated RPMEs. The unpopulated RPMEs can be removed using set theory as described above. The remaining entries are RPME 320(1, 2) and RPME 320(2, N-1), which are used to access role permissions list 310(2) and Role Permissions List 310(5), respectively. Role permissions list 310(2) and role permissions list 310(5) are then merged to form a UGPL. The merger can be performed in a least restrictive manner using an order dependent merge (ODM). Alternatively, the lists can be merged using Binary Decision Diagrams (BDD). Other least restrictive merger techniques known to those skilled in the art can also be used to perform the merger.

Finally, the UGPL formed by the merger of role permissions list 310(2) and role permissions list 310(5) is made accessible through UGME 410(1,2). Thus, UGME 410(1,2) provides access to permissions information relating to UGI 260(1) and UGI 260(2).

Figure 6:
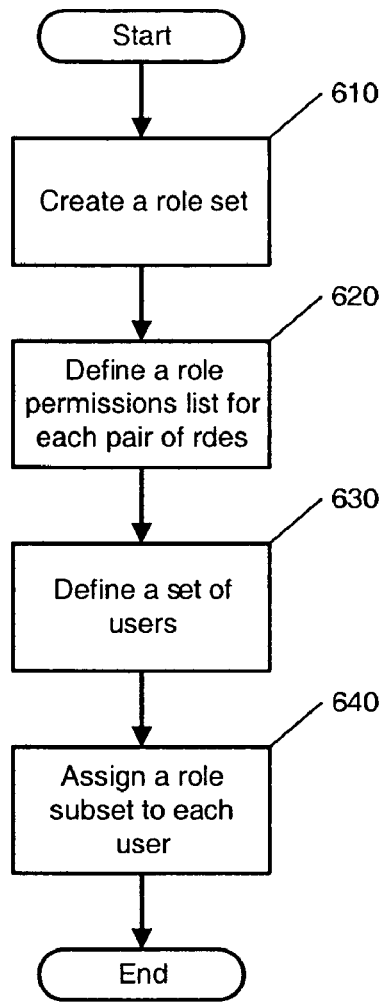
FIG. 6 is a flow diagram illustrating an example of a security administrator's responsibilities in forming a user group identifier matrix according to embodiments of the present invention.

FIG. 6 is a flow diagram illustrating an example of a security administrator's responsibilities in forming a UGI matrix according to embodiments of the present invention. First, the security administrator creates a role set (step 610). The security administrator defines a role permissions list for each pair of roles (step 620). The pair of roles can be two different roles ('Role A' and 'Role B') or two of the same role ('Role A' and 'Role A'). When the permissions list designates an access control relationship between two different roles, the access control relationship is considered an inter-role relationship. When the permissions list designates an access control relationship between a role and itself, or between entities within a single role, the access control relationship is considered an intra-role relationship. The security administrator also defines a set of users (step 630) and assigns a role subset to each user in the set of users (step 640).

It will be noted that the security administrator can be an individual or group of individuals with the responsibilities of defining a set of roles, defining a set of users, creating permissions lists, and assigning users to their respective roles. In another embodiment, some or all of the responsibilities of the security administrator can be automated.

Figure 7:
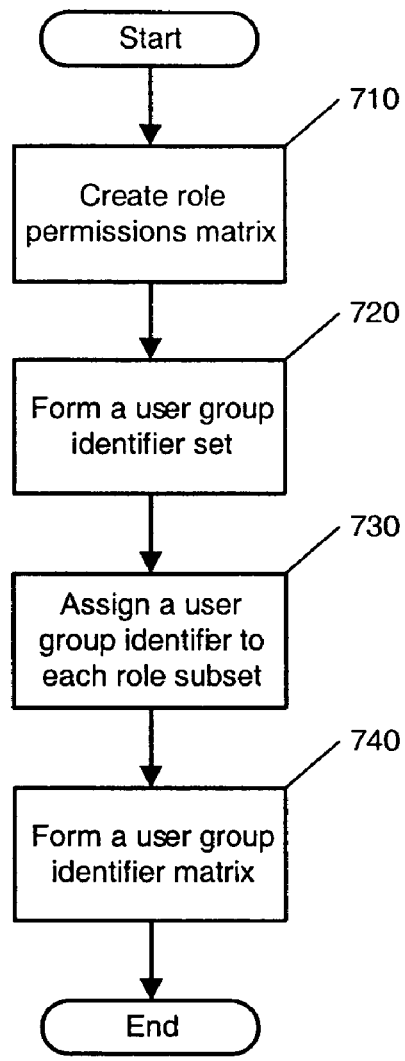
FIG. 7 is a flow diagram illustrating an example of the operation of a security management station in forming a user group identifier matrix according to embodiments of the present invention.

FIG. 7 is a flow diagram illustrating an example of the operation of a security management station in forming a UGI matrix according to embodiments of the present invention. The security management station is used to create a role permissions matrix based on the role set and the role permissions lists defined by the security administrator (step 710). The security management station can also be used to identify subsets of roles and forms a UGI set by assigning a UGI to each role subset (steps 720 and 730). The UGI set can then be used in forming a UGI matrix (step 740).

Thus, the functions performed by the security management station include creating a role permissions matrix, forming a UGI, assigning UGIs to role subsets, and forming a UGI matrix. Some or all of these functions can also be performed by another network device or performed manually by the security administrator. However, automating the foregoing steps can simplify network security policy management. Network security policy management can also be simplified by including the security management station at a centralized point in the network.

Downloading User Group Permissions Lists (UGPLs)

As previously discussed, when a user device attempts to connect to the network, the user is first be authenticated. As part of a successful authentication, the UGI, the UGI's generation number, and a timestamp are passed to an authenticator. The timestamp is used to determine when the UGI expires, and the generation number enables UGPL caching. Once the UGI is retrieved, the UGPLs to be applied for the UGI are also retrieved. Since UGPLs rely on egress filtering, the UGPLs to be retrieved include only those UGPLs applied when the UGI is the destination group. In the UGI matrix shown in FIG. 4, the column associated with the retrieved UGI would be downloaded. For example, when UGI 260(4) is the UGI passed to the authenticator, the UGPLs accessible through the fourth column of the matrix are downloaded. When needed, the UGPLs to be retrieved can include the UGPLs applied when the UGI is the source group. In the example shown in FIG. 4, the row associated with the UGI would be downloaded to obtain these UGPLs.

In one embodiment, each UGPL retrieved contains the source group, UGPL name, generation number, and timestamp for the particular UGPL. Since the matrix is expected to be sparsely populated, the source group can be included to indicate the particular row of the entry and to allow for compaction of the UGPL name list. The timestamp indicates when the particular UGPL needs to be revalidated. The timestamp is used to age each UGPL separately; therefore, timestamps may have different values for each UGPL. If the UGPL or the UGI expires while a user associated with the UGI is still authenticated, the authenticator will make another request for the expired UGPL or UGI. In an alternative embodiment, the expiration of UGIs and UGPLs is detected by using a polling technique.

Figure 8:
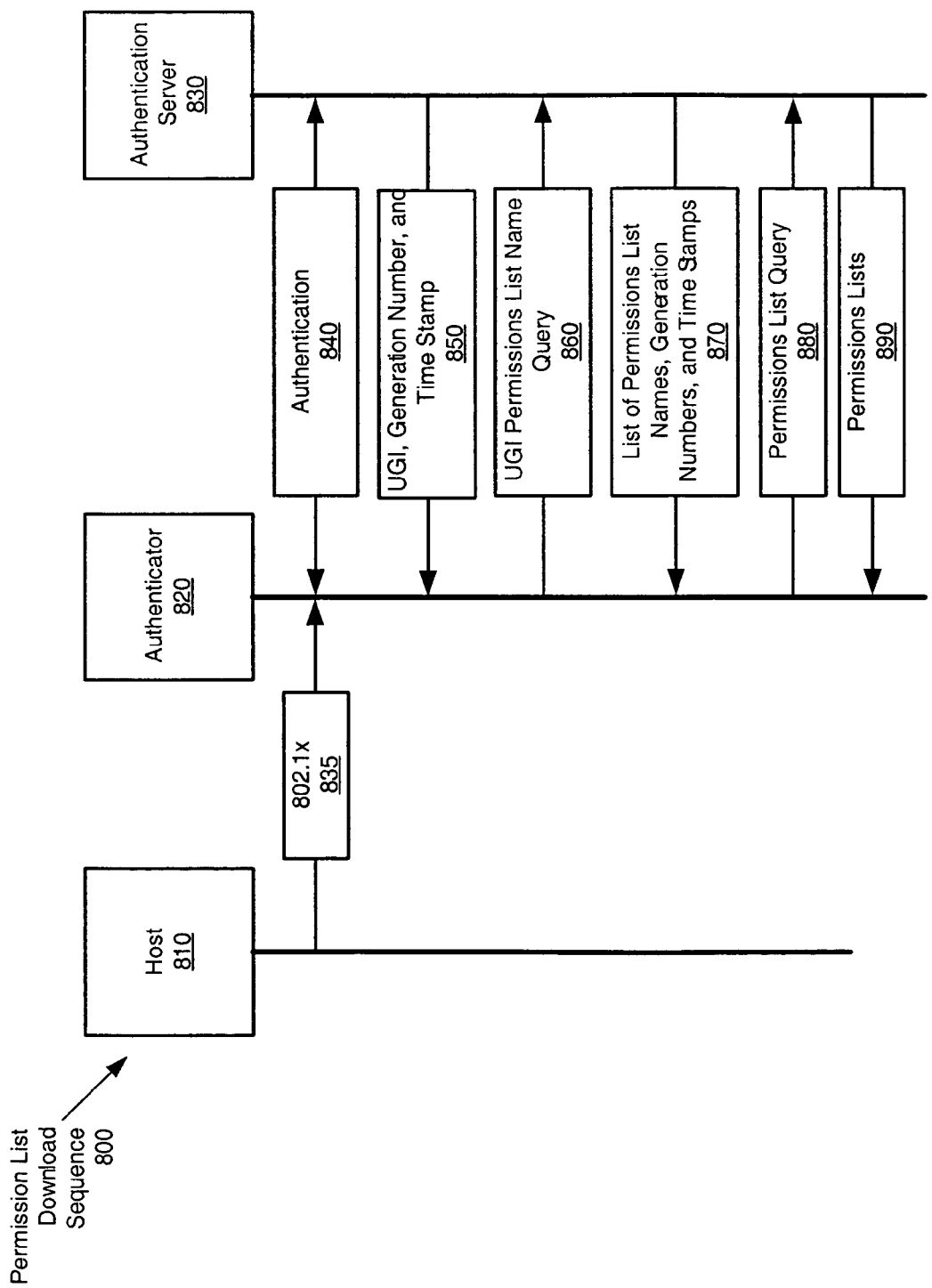
FIG. 8 is a block diagram illustrating an example of communications involved in a user group permissions list download sequence according to embodiments of the present invention.

FIG. 8 is a block diagram illustrating an example of communications involved in a permissions list download sequence 800 according to embodiments of the present invention. First, a host 810 is authenticated with an authenticator 820 using an 802.1X protocol (communication 835). Authenticator 820 can be, for example, a network switch or router. In performing the authentication (communication 840), authenticator 820 communicates with an authentication server 830. When host 810 is authenticated with authenticator 820, a timestamp is associated with the authentication. The security management station (not shown) is responsible for assigning the timestamp.

Authentication server 830 sends authenticator 820 the UGI assigned to host 810. Authentication server 830 also sends authenticator 820 the generation number of the UGI and the authentication timestamp associated with the UGI (communication 850). If the UGI had previously been cached at authenticator 820, authenticator 820 can check whether the newly received UGI's generation number matches the generation number of the cached UGI. If the generation numbers are not the same, authenticator 820 queries authentication server 830 for the UGPL names associated with the UGI (communication 860). Authentication server 830 responds by sending a set of UGPL names. Authentication server 830 also sends generation numbers and authentication timestamps for each UGPL name (communication 870). Next, authenticator 820 checks whether each newly received UGPL generation number matches a corresponding generation number stored on authenticator 820. For each generation number that does not match, authenticator 820 queries authentication server 830 for the UGPL associated with that generation number (communication 880). Authentication server 830 then downloads the requested UGPLs to authenticator 820(communication 890).

Security Policy Maintenance

The present invention provides the flexibility of modifying role sets, user sets, permissions lists, and permissions matrices. For example, when a role is added to a user's original role subset, the new role subset formed is compared to all of the existing role subsets. If the new role subset is the same as an existing role subset, the user is assigned to the previously existing role subset and the previously existing role subset's UGI. No recompilation of the UGI matrix is necessary and the generation number of the UGI need not be incremented.

If the user was the only entity assigned to the user's original role subset and the new role subset is different than all other existing role subsets, the user's original UGI is retained for the user and assigned to the user's new role subset. The row and column of the UGI matrix that correspond to the UGI need to be recompiled. If recompilation causes an entry in the UGI matrix to change, the generation numbers for the UGIs associated with the row and column of the entry are incremented.

If the user was not the only entity assigned to the user's original role subset and the new role subset is different than all other existing role subsets, a UGI is taken from the pool of free UGIs and assigned to the new role subset. The user is assigned to the new UGI, the UGI generation number is set, and a timestamp is assigned to the UGI. The row and column of the UGI matrix that correspond to the UGI are recompiled. If recompilation causes an entry in the UGI matrix to change, the generation numbers for the UGIs associated with the row and column of the entry are incremented. At this point, UGI timestamps are updated as necessary.

When a role is removed from a user's role subset, the new role subset formed is compared to the existing role subsets. This modified role subset is handled in the same way as the modified role subset for a role addition, as described above. Furthermore, adding a user to a role subset is handled in the same way that adding a role to a role subset is handled.

When a user is removed from a role subset, the network's security policy is not impacted unless the user was the last user assigned to the particular role subset. If the user is the last user assigned to the role subset, the role subset is released and the UGI is marked as deleted. The UGI matrix is recompiled for the row and column corresponding to the deleted UGI. The UGI will be returned to the free pool of UGI's upon expiration of the associated timestamp (to avoid any clock skews, an additional timestamp expiration can be allowed to pass before releasing the UGI to the free pool of UGIs).

The security administrator can add a new role to an organization's role set, and the new role can be added to a user's role subset as described previously. The security administrator can also remove a role from the organization's role set. When the role is removed from the organization's role set, the role is also removed from the role subsets that include the role. The procedure for removing a role from a role subset was also described previously.

The security administrator is also free to reassign, change or remove role permissions lists. When a new or updated role permissions list is applied between two roles, R1 and R2 for example, the role permissions matrix is updated such that the role permissions list is accessible through the (R1, R2) entry in the role permissions matrix. The UGI matrix is recompiled for the row and column of each UGI that contains either R1 or R2. If the recompilation causes an entry in the UGI matrix to change, the generation number for the UGIs associated with the row and column of the entry are incremented and their timestamps are updated (if necessary).

Figure 9:
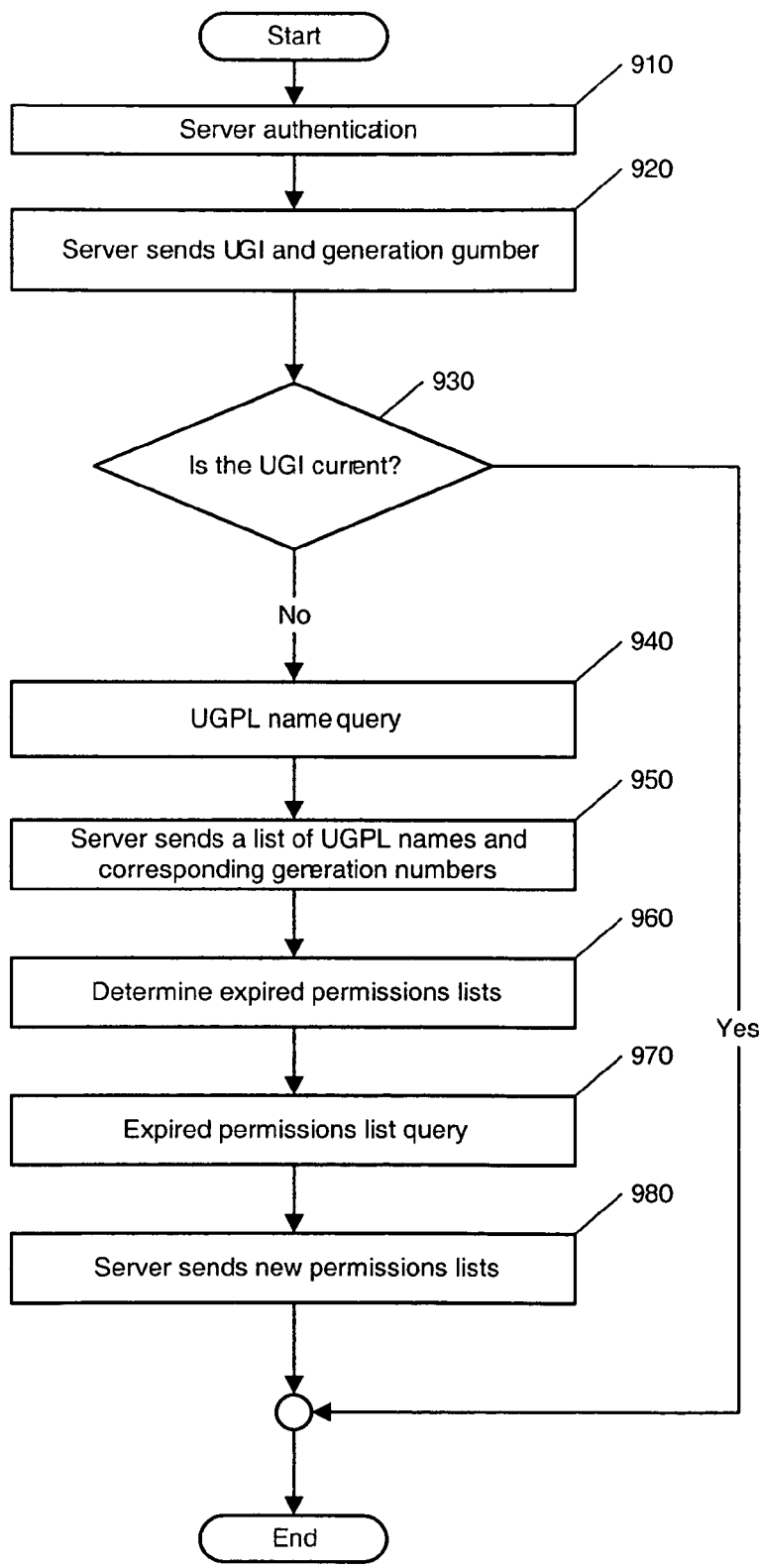
FIG. 9 is a flow diagram illustrating an example of updating a user group permissions list according to embodiments of the present invention.

FIG. 9 is a flow diagram illustrating an example of updating a permissions list according to embodiments of the present invention. First, the user is authenticated with an authentication server (step 910). The authentication server sends an authenticator the UGI and UGI generation number associated with the user (step 920). If the user's UGI is not current, the authenticator queries the authentication server for the UGPL names associated with the UGI (steps 930 and 940). In one embodiment, the UGPL names are UGIMEs. The authentication server sends a list of UGPL names and corresponding generation numbers to the authenticator (step 950). The authenticator determines which UGPLs have expired (step 960), and queries the authentication server for those UGPLs (step 970). The authentication server responds by sending the new UGPLs to the authenticator (step 980). Thus, the expired UGPLs and UGIs are detected and updated.

Tagging a Packet with a User Group Identifier

It is noted that the present invention can be implemented in the open systems interconnection (OSI) communications model. The OSI model includes a seven layer protocol stack. Control is passed from one protocol layer to the next, starting at an application layer and ending at a physical layer. One of skill in the art will recognize that the present invention can be implemented in other communications models.

Figure 10:
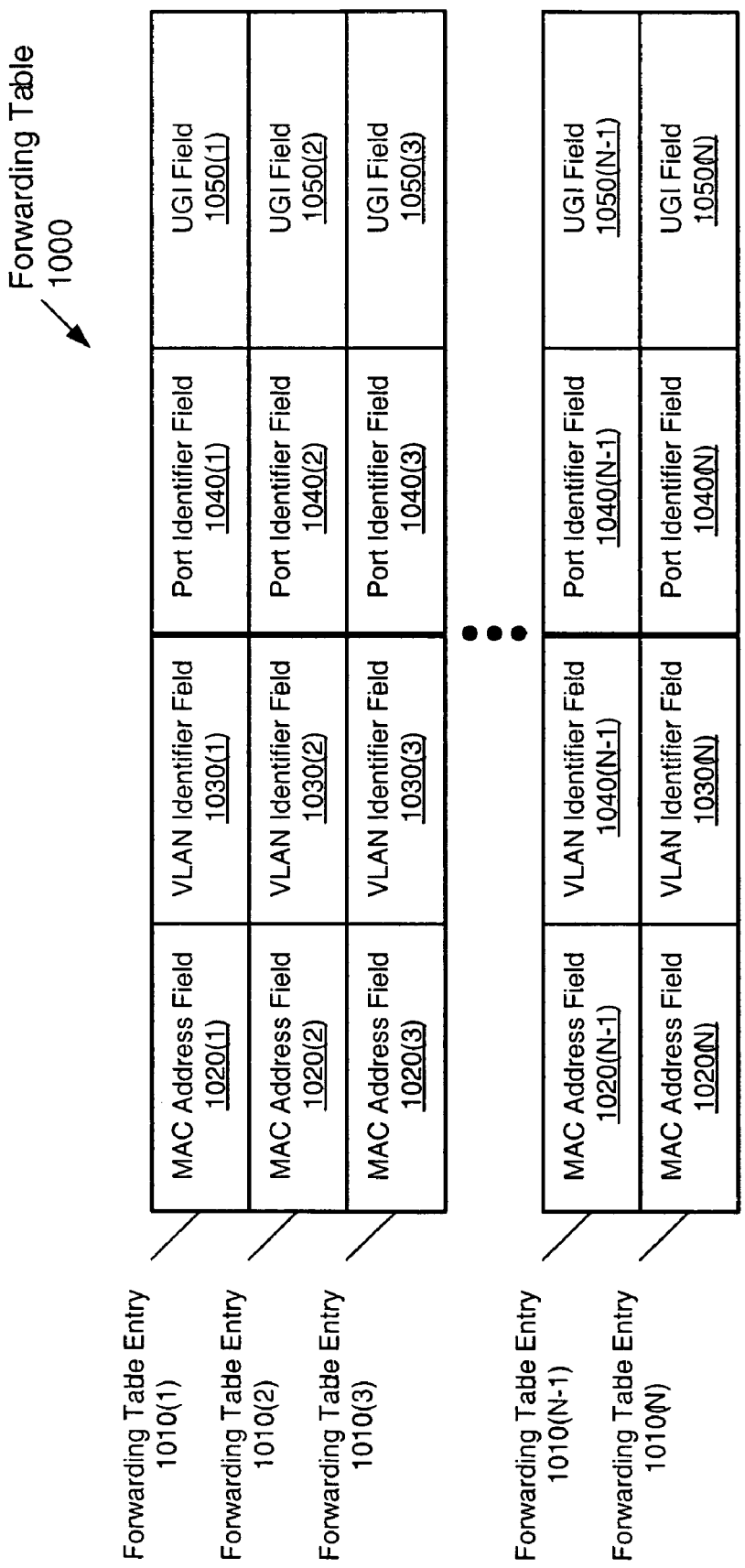
FIG. 10 is a block diagram illustrating a forwarding table according to embodiments of the present invention.

FIG. 10 is a block diagram illustrating a forwarding table 1000 according to the present invention. Forwarding table 1000 includes a number of forwarding table entries (depicted in FIG. 10 as forwarding table entries 1010). Each of forwarding table entries 1010 includes a number of fields, certain of which are depicted in FIG. 10. Among these fields are a MAC address field (depicted as MAC address fields 1020), a virtual local area network (VLAN) identifier field (depicted as VLAN identifier fields 1030), a port identifier field (depicted as port identifier fields 1040), and a UGI (tag) field (depicted as UGI fields 1050).

When the media access control (MAC) address and VLAN have been authenticated on a given port, the user group retrieved via the RADIUS authentication is assigned to the MAC address/VLAN identifier combination. This information appears in forwarding table 1000 in MAC address fields 1020 and VLAN identifier fields 1030. Forwarding table 1000 thus contains the MAC address/VLAN identifier combinations that can be used as a look-up key with the result of the look-up providing the port identifier (as stored in the appropriate one of port identifier fields 1040) and the UGI (as stored in a corresponding one of UGI fields 1050. The particular one of forwarding table entries 1010 is preferably static on the ingress authenticator, and in such a case, removal should be triggered by the authentication protocol employed, and not the aging criteria that are typically employed with forwarding table entries.

It will be noted that, in one implementation, when a packet is sent by a host, the layer 2 learning look-up (provided as part of the rigging function in the network authenticator that maintains forwarding table 1000) also derives the UGI for the packet by looking up the packet's contents in the forwarding table. Alternatively, the authenticator's layer 2 learning look-up can be designed to extract the UGI from the packet itself. This UGI is used to tag the packet for identification as having been generated by a user in the given user group.

In one embodiment, the UGPL is a role based access control list (RBACL) and the UGI is a security group tag (SGT). This SGT is inserted into the packet for use in the subsequent processing of the packet. For example, the SGT can be inserted into the layer 2 header, making such information available to nodes in the core network (such as layer 3 routers and layer 2 authenticators).

Before the appropriate RBACL can be applied, a determination is also made as to the destination user group (DUG). While a number of mechanisms can be used to make such a determination, two ways to determine the DUG of the object (server) are now discussed. As will be appreciated, each has its own advantages in certain scenarios.

The first mechanism to determine DUG employs information in the forwarding information base (FIB). For most cases involving network traffic using IP, the destination user group can be derived from the FIB. On the egress network layer 3 (L3) edge of the network, the FIB will be populated with the resolved host prefix after ARP resolution is performed. Since the ARP response is the trigger for the FIB entry update and needs to be received before any traffic flows to the host, the ARP response is used as the trigger to insert the destination user group into the FEB entry.

The exact method of deriving the destination user group depends on the platform and network connectivity to the host. The following are the three different possible scenarios for deriving the destination user group.

In the first scenario, the host is authenticated directly with the router. In this case, the host is directly connected to a traditional router (one without network layer 2 (L2) authenticating). When the ARP response is received, the local authentication database will be queried to retrieve the corresponding user group for the destination IP address. If no entry is found in the local authentication database, a default destination user group will be assigned.

In the second scenario, the host is authenticated directly with the directly-connected network layer 2 (L2) authenticator. When the host authenticates with the directly connected L2 authenticator, the router may be multiple hops away within network layer 2. When the ARP response is received by the edge authenticator directly connected to the host, the packet is tagged with the SGT by one of the mechanisms as described previously. When the ARP response is received by the router that triggered the ARP request, the destination user group will be taken from the packet itself.

In the third scenario, the host is authenticated directly with the network layer 3 (L3) authenticator. In this case, the host is directly connected to the L3 authenticator providing the authentication and the edge L3 interface for the host. It will be noted that the term, "L3 authenticator", refers to a router with the additional functionality of an L2 authenticator. When the ARP response arrives from the host, the packet is marked with the SGT from the media access control (MAC) layer, VLAN learning lookup in the L2 table. In this manner, the L3 authenticator can view this case as the same as the previous scenario.

Alternatively, the destination user group can be determined via a static ingress ACL. As will be appreciated, when connecting an RBACL-enabled network to a non-RBACL-enabled network, the authentication infrastructure will not be present in the non-RBACL-enabled network. In a manner similar to assigning the source user group described previously, the destination user group needs to be classified via the same mechanism in such situations. By using the ingress ACL to provide the destination user group classification, the destination IP addresses/sub-nets can indicate the destination user group to determine the correct RBACL to apply. It will be noted that the egress ACL may also be used, so long as the DUG determination occurs before the RBACL enforcement. It will be appreciated that, not infrequently, it is better to check using an egress ACL.

Figure 11:
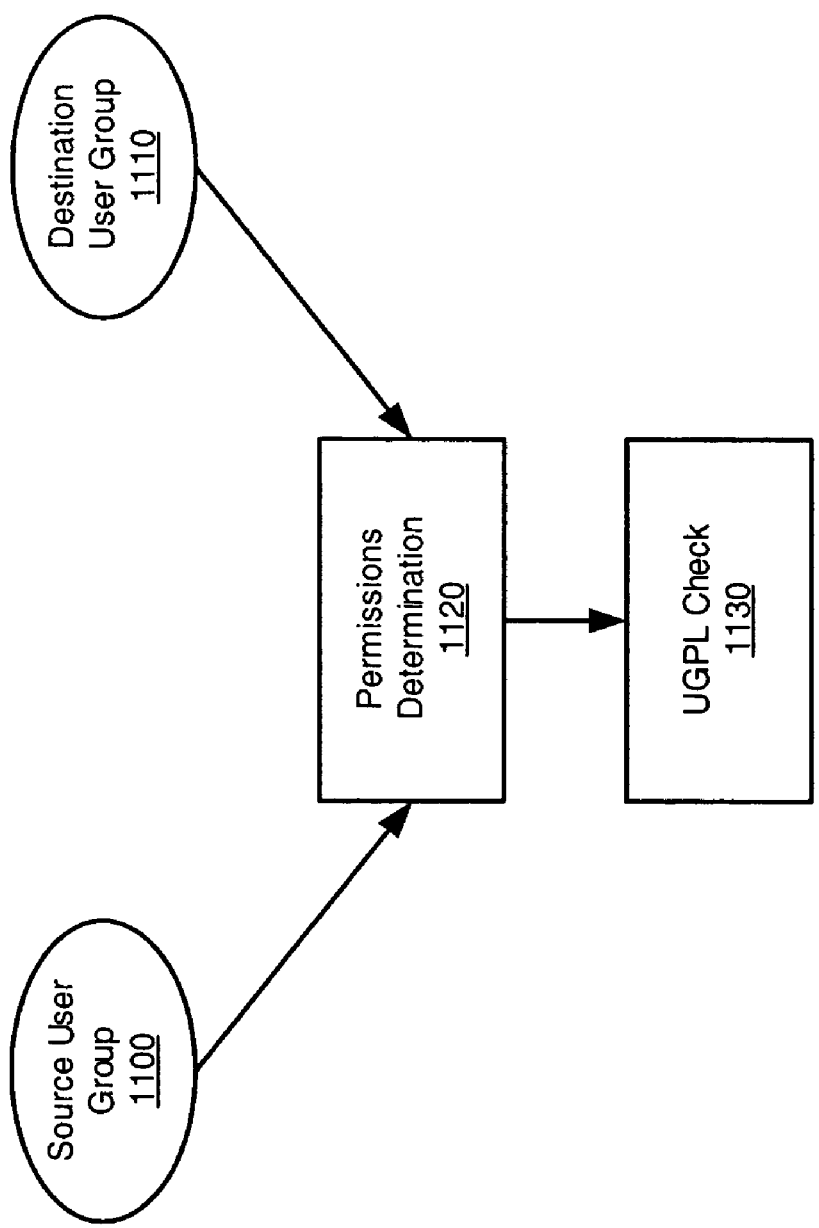
FIG. 11 is a diagram illustrating a process of determining applicable permissions for a packet according to embodiments of the present invention.

FIG. 11 is a diagram illustrating a process of determining applicable permissions for a given packet, using the operations discussed above. The packet's source user group (depicted in FIG. 11 as a source user group (SUG) 1100) and destination user group (depicted as a destination user group (DUG) 1110) are taken as inputs to a permissions determination process (depicted as a permissions determination 1120). Thus, the SUG and DUG are thus inputs to the process of determining which permissions to apply, as has been described. Permissions determination 1120 will typically employ a permission list. The permission list determination is performed through the usage of a UGI matrix. In the case posited here, the source user group and destination user group are employed to make this determination. The results of permissions determination 1120 are then checked in a UGPL check 1130. Thus, the SUG and DUG are used to determine the UGPL (user group permissions list) that applies.

Figure 12:
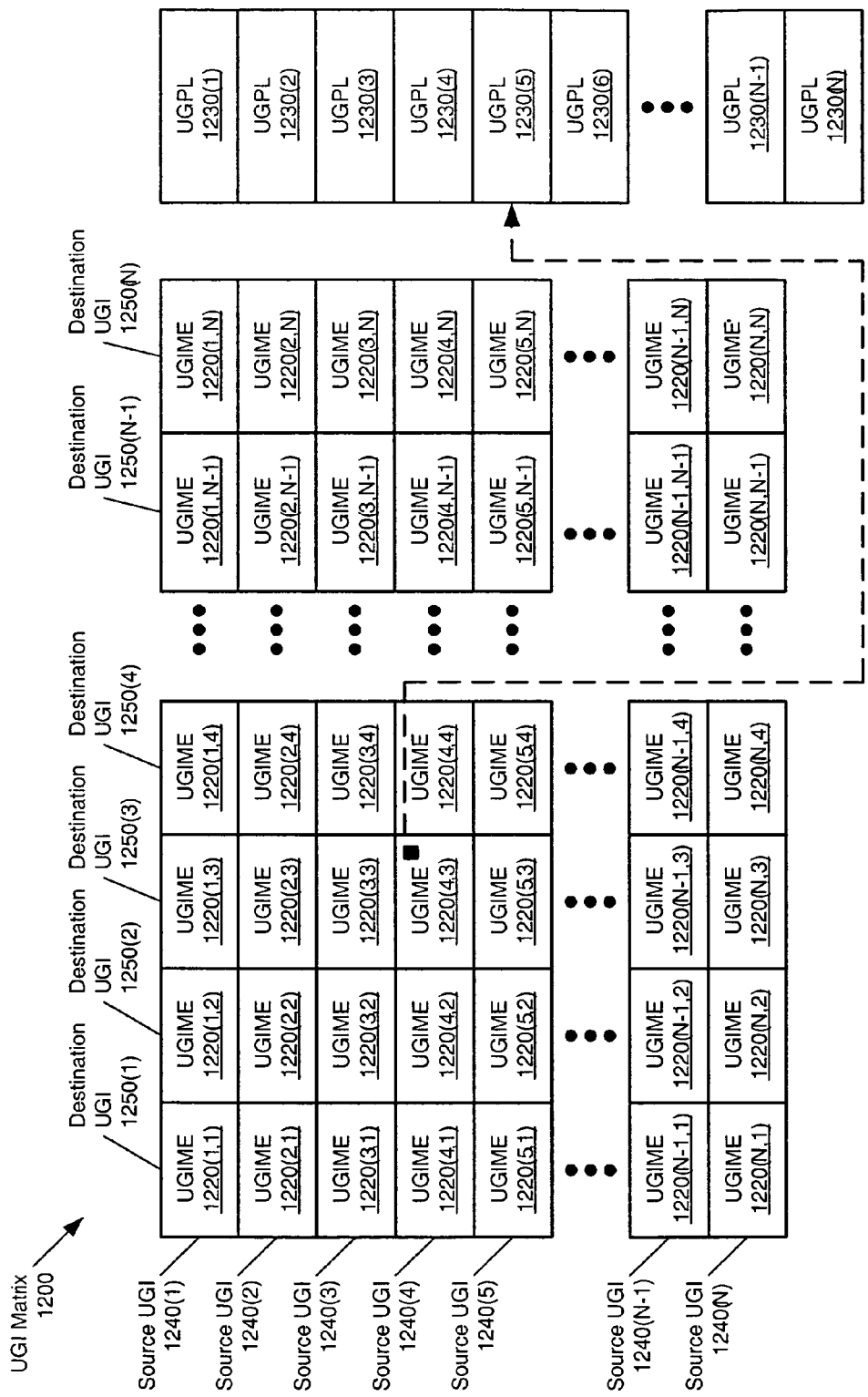
FIG. 12 is a block diagram illustrating a user group identifier matrix according to embodiments of the present invention.

FIG. 12 is a block diagram illustrating a UGI matrix 1200 according to embodiments of the present invention. Each of the entries in UGI matrix 1200(depicted as UGI matrix entries, or UGIMEs 1220) point to one of the UGPLs 1230. Each of the UGIMEs 1220 is indexed by one of a number of source UGIs 1240 and one of a number of destination UGIs 1250. As will be apparent, each of source UGIs 1240 corresponds to a row in UGI matrix 1200, while each of destination UGIs 1250 corresponds to a column in UGI matrix 1200. Each UGPL 1230 provides a list of permissions as to the kinds of network traffic that are permitted between the source user group and destination user group. For example, given a source UGI of four (4) and a destination UGI of three (3), UGIME 1220(4,3) is identified. UGIME 1220(4,3) includes a pointer to UGPL 1230(5). UGPL 1230(5) might contain a UGPL such as the following:

permit tcp www
permit tcp telnet
permit tcp ftp
permit tcp ftp-data
implicit deny As noted, the number of these permissions lists is significantly smaller in comparison to the number of traditional ACLs. This is because such permissions are typically not applied to all network traffic traversing a given interface, but only to traffic between two specific user groups. For example, specification of the types of traffic allowed in from the Internet (the interface ACL) is no longer needed—only the types of traffic allowed coming in from the Internet to certain servers need be specified (in the UGPL).

Typically, the UGI matrix will be sparsely populated. However, a particular column or row of the matrix may be fully populated. If we view the security policy as a list of permission sets between source and destination groups, the security policy can be defined as:

TABLE 1

| UGI matrix example. | | |
|---|---|---|
| SUG1 | DUG4 | UserGroupPermissionListA |
| SUG2 | DUG5 | UserGroupPermissionListB |
| SUG3 | DUG6 | UserGroupPermissionListC |

Figure 13A:
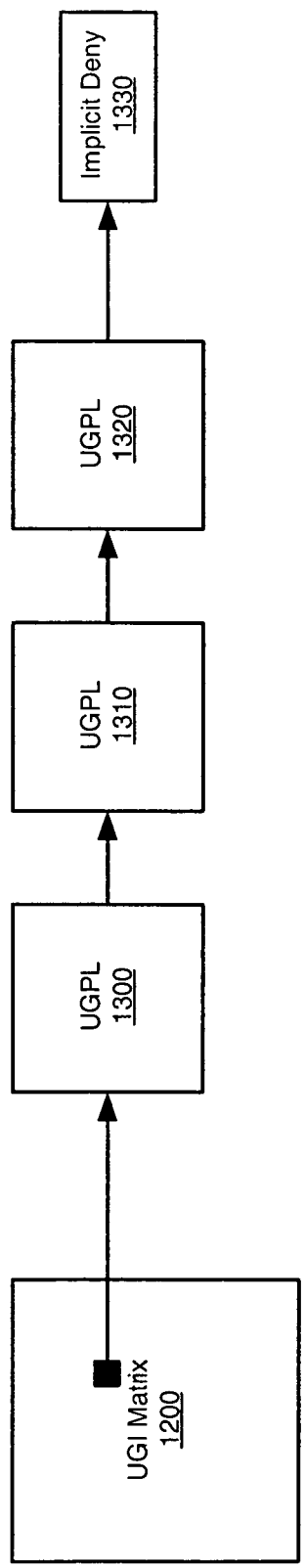
FIG. 13A is a block diagram illustrating an example of user group identifier matrix chaining according to embodiments of the present invention.

FIG. 13A is a block diagram illustrating an example of UGI matrix chaining according to the present invention. In the scenario presented in FIG. 13A, the pointer that is selected in UGI matrix 1200 points to one of a number of UGPLs (depicted in FIG. 13A as a UGPL 1300, a UGPL 1310, and a UGPL 1320), which, in turn, point to one another and are terminated by an implicit deny permission (depicted as implicit deny 1330 in FIG. 13A). An example of UGPLs 1300, 1310 and 1320 is given in Table 1 above. Thus, as can be seen, UGPL 1320 builds on the permissions listed in UGPL 1310, which, in turn, builds on the permissions list listed in UGPL 1300. As with a typical UGPL, the list is terminated by an implicit deny, indicating that, unless otherwise specifically allowed, no permissions are granted.

In the manner depicted in FIG. 13A, a list of permissions can be created for each of the entries in UGI matrix 1200 by simply combining UGPLs (e.g. UGPLs 1300, 1310, and 1320, as well as other such UGPLs) to arrive at the desired set of permissions for the source user group and destination user group combination represented by the entry in UGI matrix 1200 that points to the given group of UGPLs.

A desirable feature is to allow a network's security administrator to specify a UGPL for any source group communicating with a specific destination group and vice versa. If a UGI is a single identifier without any semantics encoded in the value, providing variable masking of the group identifier is of little value. However, masking the entire group identifier addresses the above need. This leads to the four possible forms of specifying a UGPL assignment.

| SUGx | DUGy | UserGroupPermissionsList1 |
|---|---|---|
| ANY | DUGy | UserGroupPermissionsList2 |
| SUGx | ANY | UserGroupPermissionsList3 |
| ANY | ANY | UserGroupPermissionsList4 |

It will be noted that the final form (ANY to ANY) would fill the entire matrix with the UserGroupPermissionsList4. Such a configuration can lead to a given packet potentially needing multiple UGPLs to be applied. Conceptually, the matrix points to a chain of UGPLs (as in FIGS. 13A and 13B), where each is traversed in order. As depicted, each UGPL is terminated with an implicit continue, and the implicit deny is applied at the end of the chain.

In fact, the pointer structures that support such combinations can be separated from the UGPLs themselves, simplifying the pointer structures and reducing the duplication of permission information. Such an approach is discussed below in connection with FIG. 13B.

Figure 13B:
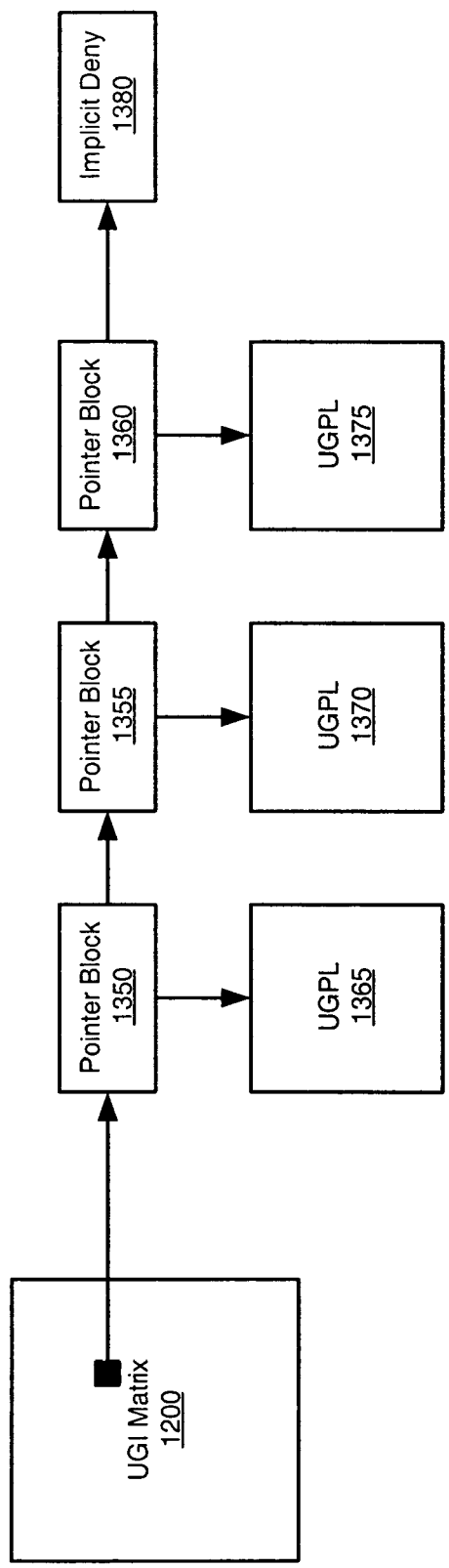
FIG. 13B is a block diagram illustrating another example of user group identifier matrix chaining according to embodiments of the present invention.

FIG. 13B is a block diagram illustrating an example of a set of UGPLs that employ a separate set of pointer structures (referred to herein as chaining) in order to simplify the set of UGPL structures necessary to support the present invention. As before, an entry in UGI matrix 1200 is a pointer to the desired set of UGPLs. However, in contrast to the structures shown in FIG. 13A, the given entry in UGI matrix 1200 points to one of a number of pointer blocks (depicted in FIG. 13B as pointer blocks 1350, 1355 and 1360). As can be seen, pointer block 1350 points to both a UGPL 1365 and pointer block 1355. In a similar fashion, pointer block 1355 points at a UGPL 1370, as well as pointer block 1360. Similarly, pointer block 1360 points at a UGPL 1375, but in contrast, also points at an implicit deny 1380, which terminates the pointer chain. It will be apparent that complex structures can be created using this approach, allowing a user to make different use of UGPLs by judicious use of pointers.

In the architecture depicted in FIG. 13B, each of the entries of UGI matrix 1200 points to a pointer block, such as pointer block 1350. Pointer block 1350 points both at a UGPL (e.g., UGPL 1365) and either another pointer block (e.g., pointer block 1355) or an implicit deny (e.g., implicit deny 1380). Thus, each UGPL (e.g., UGPLs 1365, 1370 and 1375) are available to any one of the pointer blocks that makes up the overall UGPL ultimately implemented for a given entry in UGI matrix 1200. Such an architecture allows for the efficient use of UGPLs by requiring only one such UGPL for any type of permission that might be implemented. Thus, for each set of permissions, the system merely implements a set of pointer blocks and causes those pointer blocks' UGPL pointers to point at the UGPLs necessary to implement the desired set of permissions. Since each of these permissions can be reused any number of times, the space consumed by such an implementation is significantly less than it might otherwise be.

Figure 13C:
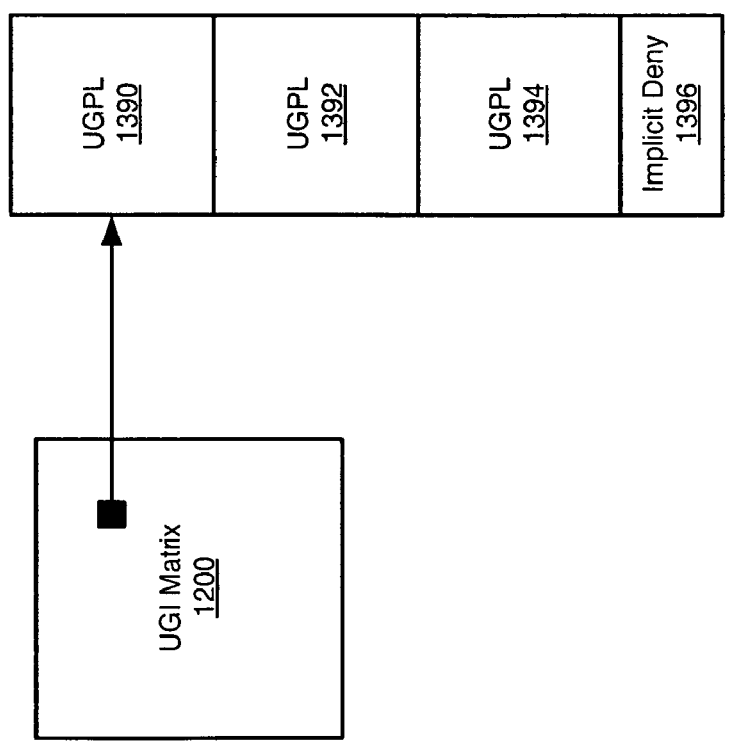
FIG. 13C is a block diagram illustrating a logical view of the examples of user group identifier matrix chaining depicted in FIGS. 13A and 13B according to embodiments of the present invention.

FIG. 13C is a block diagram illustrating a logical view of the examples of UGI matrix chaining depicted in FIGS. 13A and 13B according to the present invention. As noted in both examples, the given entry of UGI matrix 1300 points to the first of a number of UGPLs (depicted in FIG. 13C as UGPLs 1390, 1392 and 1394), which are terminated by an implicit deny 1396, in the manner previously discussed.

Thus, in a software based implementation, a tree-based, hash-based, or other such lookup structure can be employed, with the lookup being a match on the concatenation of the source and destination user groups. The result of the lookup is a pointer to a chain of UGPLs. These UGPLs are traversed in the order they are present in the chain. The UGPLs are viewed logically as a single chained UGPL.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of the invention. Moreover, while the invention has been particularly shown and described with reference to these specific embodiments, it will be understood by those skilled in the art that the foregoing and other changes in the form and details may be made therein without departing from the spirit or scope of the invention.

What is claimed is:

1. A method comprising:
    creating a user group permissions list,
        wherein
        the user group permissions list is created using a role permissions list,
        the role permissions list is accessible via an entry in a role permissions matrix,
        the entry is associated with a row and a column of the role permissions matrix,
        the row of the role permissions matrix is indexed using a first role, wherein the first role represents a first function within an organization, and
        the column of the role permissions matrix is indexed using a second role,
            wherein
            the second role represents a second function within the organization, and
        the role permissions list defines an access control relationship between the first role and the second role.

2. The method of claim 1, wherein
    the role permissions list is an access control list.

3. The method of claim 2, wherein
    the access control relationship comprises at least one of:
        an intra-role relationship, and
        an inter-role relationship.

4. The method of claim 3, wherein
    the entry in the role permissions matrix comprises at least one of:
        a reference to the role permissions list, and
        the role permissions list.

5. The method of claim 4, wherein
    the first role and the second role are the same.

6. The method of claim 1, wherein
    the access control relationship consists of a relationship between the first role and the second role.

7. The method of claim 6, further comprising:
    defining a role set, wherein
        the role set comprises the first role and the second role.

8. The method of claim 1, wherein the creating the user group permissions list further comprises:
    assigning a first user group identifier to a first role subset;
    assigning a second user group identifier to a second role subset; and
    creating the user group permissions list such that the user group permissions list sets forth the access control relationship between the first user group identifier and the second user group identifier.

9. The method of claim 8, further comprising:
    creating the first role subset, wherein
        the first role subset comprises the first role; and
    creating the second role subset, wherein
        the second role subset comprises the second role.

10. The method of claim 8, wherein the creating the user group permissions list further comprises:
    taking a Cartesian product of the first user group identifier and the second user group identifier.

11. The method of claim 10, wherein the taking the Cartesian product of the first user group identifier and the second user group identifier further comprises:
    replacing the first user group identifier with the first role subset;
    replacing the second user group identifier with the second role subset; and
    taking the Cartesian product of the first role subset and the second role subset to obtain a set of ordered pairs.

12. The method of claim 11, further comprising:
    obtaining a first role permissions list by using a first ordered pair from the set of ordered pairs;
    obtaining a second role permissions list by using a second ordered pair from the set of ordered pairs; and
    merging the first role permissions list and the second role permissions list to create the user group permissions list.

13. The method of claim 12, wherein
    the merging the first role permissions list and the second role permissions list is performed in a least restrictive manner.

14. The method of claim 11, further comprising:
    minimizing the set of ordered pairs.

15. The method of claim 1, further comprising:
    updating a set of role permissions matrix entries,
        wherein the updating is performed responsive to at least one of:
            a time stamp, and
            a generation number.

16. The method of claim 15, further comprising:
    updating the set of role permissions matrix entries, wherein the updating is performed responsive to at least one of:
        a time stamp, and
        a generation number.

17. The method of claim 1, wherein
    the first function and the second function are the same.

18. A computer program product comprising:
    a first set of instructions, executable on a computer system, configured to create a user group permissions list, wherein
        the user group permissions list is created using a role permissions list,
        the role permissions list is accessible via an entry in a role permissions matrix, the entry is associated with a row and a column of the role permissions matrix, the row of the role permissions matrix is indexed using a first role, wherein the first role represents a first function within an organization, and the column of the role permissions matrix is indexed using a second role, wherein the second role represents a second function within the organization, and the role permissions list defines an access control relationship between the first role and the second role; and a persistent computer readable media, wherein the computer program product is encoded in the persistent computer readable media.

19. The computer program product of claim 18, wherein the role permissions list is an access control list.

20. The computer program product of claim 19, wherein the access control relationship comprises at least one of:
  an intra-role relationship, and
  an inter-role relationship.

21. The computer program product of claim 20, wherein the entry in the role permissions matrix comprises at least one of:
  a reference to the role permissions list, and
  the role permissions list.

22. The computer program product of claim 21, wherein the first role and the second role are the same.

23. The computer program product of claim 18, wherein the access control relationship consists of a relationship between the first role and the second role.

24. The computer program product of claim 23, further comprising:
  a second set of instructions, executable on the computer system, configured to define a role set, wherein
    the role set comprises the first role and the second role.

25. The computer program product of claim 18, wherein the first set of instructions comprises:
  a first subset of instructions, executable on the computer system, configured to
    assign a first user group identifier to a first role subset,
    assign a second user group identifier to a second role subset, and
    create the user group permissions list such that the user group permissions list sets forth the access control relationship between the first user group identifier and the second user group identifier.

26. The computer program product of claim 25, further comprising:
  a second set of instructions, executable on the computer system, configured to
    create the first role subset, wherein the first role subset comprises the first role, and
    create the second role subset, wherein the second role subset comprises the second role.

27. The computer program product of claim 25, wherein the first set of instructions further comprises:
  a second subset of instructions, executable on the computer system, configured to take a Cartesian product of the first user group identifier and the second user group identifier.

28. The computer program product of claim 27, wherein the second subset of instructions comprises:
  a third subset of instructions, executable on the computer system, configured to
    replace the first user group identifier with the first role subset,
    replace the second user group identifier with the second role subset, and
    take the Cartesian product of the first role subset and the second role subset to obtain a set of ordered pairs.

29. The computer program product of claim 28, further comprising:
  a second set of instructions, executable on the computer system, configured to
    obtain a first role permissions list by using a first ordered pair from the set of ordered pairs,
    obtain a second role permissions list by using a second ordered pair from the set of ordered pairs, and
    merge the first role permissions list and the second role permissions list to create the user group permissions list.

30. The computer program product of claim 29, wherein the second set of instructions comprises:
  a first subset of instructions, executable on the computer system, configured to
    merge the first role permissions list and the second role permissions list in a least restrictive manner.

31. The computer program product of claim 28, further comprising:
  a second set of instructions, executable on the computer system, configured to
    minimize the set of ordered pairs.

32. The computer program product of claim 18, further comprising:
  a second set of instructions, executable on the computer system, configured to
    download a set of role permissions matrix entries associated with a user group identifier of a source.

33. The computer program product of claim 32, further comprising:
  a third set of instructions, executable on the computer system, configured to
    update the set of role permissions matrix entries, wherein
      the updating is performed responsive to at least one of:
        a time stamp and
        a generation number.

34. An apparatus comprising:
  means for generating an entry of a role permissions matrix; and
  means for creating a user group permissions list, wherein
    the user group permissions list is created using a role permissions list,
    the role permissions list is accessible via an entry in a role permissions matrix,
    the entry is associated with a row and a column of the role permissions matrix,
    the row of the role permissions matrix is indexed using a first role, wherein the first role represents a first function within an organization, and
    the column of the role permissions matrix is indexed using a second role, wherein
      the second role represents a second function within the organization, and
    the role permissions list defines an access control relationship between the first role and the second role.

35. The apparatus of claim 34, wherein
the role permissions list is an access control list.

36. The apparatus of claim 35, wherein
the access control relationship comprises at least one of:
  an intra-role relationship, and
  an inter-role relationship.

37. The apparatus of claim 36, wherein
the entry in the role permissions matrix comprises at least one of:
a reference to the role permissions list, and
the role permissions list.

38. The apparatus of claim 37, wherein
the first role and the second role are the same.

39. The apparatus of claim 34, wherein
the access control relationship consists of a relationship between the first role and the second role.

40. The apparatus of claim 39, further comprising:
means for defining a role set, wherein
the role set comprises the first role and the second role.

41. The apparatus of claim 34, wherein the means for creating the user group permissions list further comprises:
means for assigning a first user group identifier to a first role subset;
means for assigning a second user group identifier to a second role subset; and
means for creating the user group permissions list such that the user group permissions list sets forth an access control relationship between the first user group identifier and the second user group identifier.

42. The apparatus of claim 41, further comprising:
means for creating the first role subset, wherein
the first role subset comprises the first role; and
means for creating the second role subset, wherein
the second role subset comprises the second role.

43. The apparatus of claim 41, wherein the means for creating the user group permissions list further comprises:
means for taking a Cartesian product of the first user group identifier and the second user group identifier.

44. The apparatus of claim 43, wherein the taking the Cartesian product of the first user group identifier and the second user group identifier further comprises:
replacing the first user group identifier with the first role subset;
replacing the second user group identifier with the second role subset; and
taking the Cartesian product of the first role subset and the second role subset to obtain a set of ordered pairs.

45. The apparatus of claim 44, further comprising:
means for obtaining a first role permissions list by using a first ordered pair from the set of ordered pairs;
means for obtaining a second role permissions list by using a second ordered pair from the set of ordered pairs; and
means for merging the first role permissions list and the second role permissions list to create the user group permissions list.

46. The apparatus of claim 45, wherein
the merging the first role permissions list and the second role permissions list is performed in a least restrictive manner.

47. The apparatus of claim 44, further comprising:
means for minimizing the set of ordered pairs.

48. The apparatus of claim 34, further comprising:
means for downloading a set of role permissions matrix entries associated with a user group identifier of a source.

49. The apparatus of claim 48, further comprising:
means for updating the set of role permissions matrix entries, wherein
the updating is performed responsive to at least one of:
a time stamp, and
a generation number.

50. A method comprising:
accessing a role permissions list using a role permissions matrix, wherein
the role permissions matrix is configured to allow the role permissions list to be accessed via an entry in the role permissions matrix,
the entry in the role permissions matrix references the role permissions list,
the role permissions list describes a role access control relationship between a first role and a second role,
a row of the role permissions matrix is indexed using the first role,
wherein
the first role represents a first function within an organization, and
a column of the role permissions matrix is indexed using the second role,
wherein
the second role represents a second function within the organization.

51. The method of claim 50, further comprising:
forming the role permissions list.

52. The method of claim 50, further comprising:
assigning a first role subset to a first user, wherein
the first role subset comprises the first role; and
assigning a second role subset to a second user, wherein
the second role subset comprises the second role.

53. The method of claim 52, further comprising:
assigning a first user group identifier to the first role subset;
assigning a second user group identifier to the second role subset; and
defining a user group permissions list such that the user group permissions list sets forth a user group access control relationship between the first user group identifier and the second user group identifier.

54. The method of claim 53, further comprising:
forming a user group identifier matrix, wherein the user group permissions list is accessible through an entry in the user group identifier matrix.

55. The method of claim 53, wherein
the first user group identifier is a security group tag.

56. The method of claim 52, wherein
the first role subset comprises a different subset of roles than the second role subset.

57. A method comprising:
detecting an expiration of a user group identifier, wherein
the user group identifier represents a first user group and a first subset of roles, and
the first subset of roles represent a first subset of functions within an organization; and
updating the user group identifier by accessing a user group identifier matrix,
wherein
the user group identifier matrix comprises an entry,
the entry is associated with a row and column of the user group identifier matrix,
the row of the user group identifier matrix is indexed according to a first user group identifier, and
a column of the user group identifier matrix is indexed according to a second user group identifier.

58. The method of claim 57, wherein
the updating the user group identifier is performed responsive to at least one of:
a time stamp, and
a generation number.

59. The method of claim 57, wherein the updating the user group identifier further comprises:
   downloading a column of the user group identifier matrix.
60. The method of claim 59, wherein the downloading the column of the user group identifier matrix further comprises:
   downloading a time stamp associated with the user group identifier; and
   downloading a generation number associated with the user group identifier.
61. The method of claim 57, wherein
   the detecting the expiration of the user group identifier is performed during an
   authentication of a host.
62. A data structure, in a computer readable medium, comprising:
   a user group identifier matrix, wherein
      the user group identifier matrix comprises an entry,
      the entry is associated with a row and a column of the user group identifier matrix,
      the row of the user group identifier matrix is indexed using a first user group identifier, wherein
         the first user group identifier represents a first user group and a first subset of roles, and
         the first subset of roles represents a first subset of functions within an organization, and
      the column of the user group identifier matrix is indexed using a second user group identifier, wherein
         the second user group identifier represents a second user group and a second subset of roles, and
         the second subset of roles represents a second subset of functions within the organization.
63. The data structure of claim 62, further comprising:
   a user group permissions list, wherein
      the user group permissions list is accessible through the entry in the user group identifier matrix, and
      the user group permissions list designates an access control relationship between the first user group identifier and the second user group identifier.
64. The data structure of claim 63, wherein
   the user group permissions list is an access control list.
65. The data structure of claim 64, wherein
   the access control relationship comprises at least one of:
      an intra-role relationship, and
      an inter-role relationship.
66. The data structure of claim 65, wherein
   the entry in the user group identifier matrix comprises at least one of:
      a reference to the user group permissions list, and
      the user group permissions list.
67. An apparatus comprising:
   a user group identifier matrix, wherein
      the user group identifier matrix comprises an entry,
      the entry is associated with a row and a column of the user group identifier matrix,
      the row of the user group identifier matrix is indexed using a first user group identifier, wherein
         the first user group identifier represents a first user group and a first subset of roles, and
         the first subset of roles represents a first subset of functions within an organization, and
      the column of the user group identifier matrix is indexed using a second user group identifier, wherein
         the second user group identifier represents a second user group and a second subset of roles, and
         the second subset of roles represents a second subset of functions within the organization.
68. The apparatus of claim 67, further comprising:
   a user group permissions list, wherein
      the user group permissions list is accessible through the entry in the user group identifier matrix, and
      the user group permissions list designates an access control relationship between the first user group identifier and the second user group identifier.
69. The apparatus of claim 68, wherein
   the user group permissions list is an access control list.
70. The apparatus of claim 69, wherein
   the access control relationship comprises at least one of:
      an intra-role relationship, and
      an inter-role relationship.
71. The apparatus of claim 70, wherein the entry in the user group identifier matrix comprises at least one of:
      a reference to the user group permissions list, and
      the user group permissions list.

* * * * *

UNITED STATES PATENT AND TRADEMARK OFFICE
CERTIFICATE OF CORRECTION

PATENT NO. : 7,669,244 B2  Page 1 of 1
APPLICATION NO. : 10/970532
DATED : February 23, 2010
INVENTOR(S) : Michael R. Smith It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1059 days.

Signed and Sealed this

Twenty-eighth Day of December, 2010

David J. Kappos
*Director of the United States Patent and Trademark Office*